US012806804B2

(12) United States Patent
Sheikholeslami et al.

(10) Patent No.: US 12,806,804 B2
(45) Date of Patent: Nov. 24, 2026

(54) SYSTEM AND METHOD FOR AN IMPROVED ADAPTABLE SUCTION DEVICE

(71) Applicant: Nexera Robotics Corp., Coquitlam (CA)

(72) Inventors: Sepehr Sheikholeslami, Vancouver (CA); Jeffrey M. Krahn, Coquitlam (CA); Jingyang Peng, Surrey (CA); Michael Celio, Coquitlam (CA); Carlo Menon, Zurich (CH)

(73) Assignee: Nexera Robotics Corp., North Vancouver (CA)

( * ) Notice: Subject to any disclaimer, the term of this patent is extended or adjusted under 35 U.S.C. 154(b) by 995 days.

(21) Appl. No.: 18/093,797

(22) Filed: Jan. 5, 2023

(65) Prior Publication Data

US 2023/0321847 A1 Oct. 12, 2023

Related U.S. Application Data

(63) Continuation-in-part of application No. 17/754,769, filed on Apr. 12, 2022, now Pat. No. 12,576,544.

(51) Int. Cl.
*B25J 15/06* (2006.01)

(52) U.S. Cl.
CPC ................................. *B25J 15/0683* (2013.01)

(58) Field of Classification Search
CPC ................ B25J 15/0683; B25J 15/0023; B25J 15/0052; B25J 15/0061; B25J 15/02; B25J 15/0408; B25J 15/0441; B25J 15/045; B25J 15/0616; B25J 19/0095
See application file for complete search history.

(56) References Cited

U.S. PATENT DOCUMENTS

| | | | | | |
|---|---|---|---|---|---|
| 4,561,686 | A * | 12/1985 | Atchley | B66C 1/0231 294/188 |
| 6,502,877 | B2 * | 1/2003 | Schick | B25J 15/06 294/185 |
| 8,882,165 | B2 * | 11/2014 | Lipson | B25J 15/12 294/188 |
| 10,087,020 | B1 * | 10/2018 | Ruiz | B25J 15/0616 |
| 10,569,422 | B2 * | 2/2020 | Curhan | B25J 15/0023 |
| 2015/0272749 | A1 * | 10/2015 | Amend, Jr. | A61F 2/588 623/64 |
| 2019/0217487 | A1 * | 7/2019 | Takahashi | B29C 43/183 |

* cited by examiner

*Primary Examiner* — Stephen A Vu
(74) *Attorney, Agent, or Firm* — Saul Ewing LLP

(57) ABSTRACT

The present invention will provide a suction device adapted to provide gripping and suction forces to pick up and move a wide variety of objects. This is accomplished through a suction compartment, a membrane compartment, deformable membrane sealing said membrane compartment, and at least one pressure mechanism. The at least one pressure mechanism is in fluid connection with the suction compartment and is configured to modify properties within the suction compartment to assist in providing gripping and attractive forces. The present invention will grasp an object by positioning the deformable membrane adjacent to said object, modifying the deformable membrane to conform to and create a seal with said object, and then depressurizing the suction compartment via the pressure mechanism, providing a suction force onto said object within that sealed area sufficient to grasp said object.

24 Claims, 37 Drawing Sheets

SYSTEM AND METHOD FOR AN IMPROVED ADAPTABLE SUCTION DEVICE

CROSS REFERENCE TO RELATED APPLICATIONS

The application is a continuation-in-part of U.S. patent application Ser. No. 17/754,769, entitled "SYSTEM AND APPARATUS FOR AN ADAPTABLE SUCTION DEVICE", filed on Apr. 12, 2022, the disclosure of which is incorporated herein by reference in its entirety.

BACKGROUND

The embodiments described herein relates generally to a device configured to grasp, attract, and hold objects, and more particularly, to a method and apparatus for grasping a large variety of different objects.

The rise of automation across industries such as manufacturing, agriculture, e-commerce, and logistics brings about the ever-increasing need of robotic manipulators as well as grippers that will fit onto them. More specifically, the need to grip different kinds of objects with a single gripper arises in many fields. Existing solutions involve the use of finger-type grippers or vacuum cups.

For finger type gripping devices, the gripping force, the direction of approach, and the gripping point on the object need to be well defined to ensure successful gripping while not damaging the object. Furthermore, finger type gripping devices have difficulties gripping objects from a surface of the object that is larger than the maximum opening of the fingers. Also, if a batch of cuboid-shaped boxed are tightly packed, so that all side faces of a box is in full contact with the adjacent boxes, finger type gripping devices cannot get hold of the box from the top because there is not space for the fingers to reach in and get hold of the side faces of the box.

Vacuum cups can grip objects larger than the cup size or pick one boxes from a batch of tightly packed boxes, and do not have as high demand on gripping force control.

However, since vacuum cups have difficulties gripping objects with shapes such that a seal between the object and the vacuum cup cannot be well established, the types of objects they can grip are limited, and the direction of approach and the gripping point on the object still need to be well defined.

Combining fingers and vacuum cups into a single gripping device, such as that in U.S. Pat. No. 7,409,812, can mitigate some of their respective limitations, but the issues regarding the direction of approach and the gripping point remain. Additionally, they very often still fail to grasp a large variety of objects including large surfaces which are not flat.

While several grippers exist, such as finger-type grippers and vacuum cup grippers, none are particularly effective and adapted to work for various types of objects. As such, there is a continued need for a device that can utilize gripping and suction forces to pick up and move a wide variety of objects. Furthermore, there is a continued need for a device that provide continuous attractive forces while an object is being grasped and displaced. The present invention satisfies these needs.

SUMMARY

The present invention will provide a suction device adapted to provide gripping and suction forces to pick up and move a wide variety of objects. This is accomplished through a suction compartment, a membrane compartment, deformable membrane sealing said membrane compartment, and at least one pressure mechanism. The at least one pressure mechanism is in fluid connection with the suction compartment and is configured to modify properties within the suction compartment to assist in providing gripping and attractive forces. The present invention will grasp an object by positioning the deformable membrane adjacent to said object, modifying the deformable membrane to conform to and create a seal with said object, and then depressurizing the suction compartment vis the pressure mechanism, providing a suction force onto said object within that sealed area sufficient to grasp said object.

DETAILED DESCRIPTION

Figure 1:
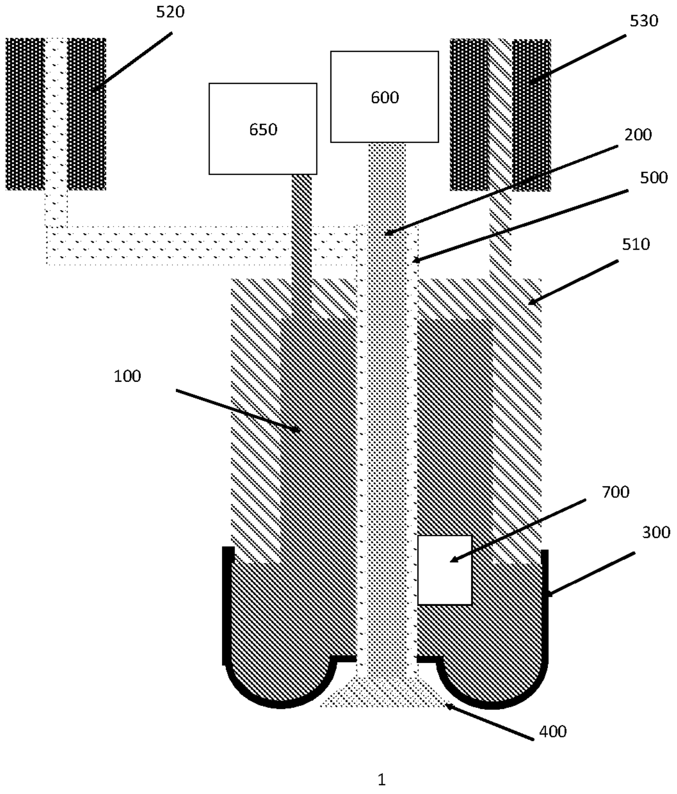
FIG. 1 is a diagram illustrating an exemplary cross-sectional view of the gripping device.
Figure 2:
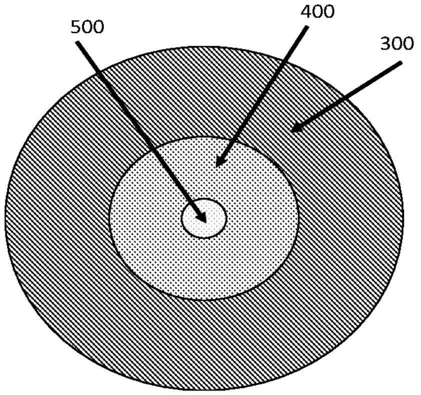
FIG. 2 is a diagram of the distal end of the gripping device.

The present invention comprises a gripping device, with an illustrated cross-sectional view shown in FIG. 1, composed of a chamber wall 510 and a membrane 300 at least partially sealing a chamber 100. The chamber wall 510 and membrane 300 are configured to allow a suction device 500 to pass through the chamber 100 unhindered. The suction device 500 is attached also to the membrane 300 but is free to slide through the at least partially sealed chamber wall 510. The suction device 500 is attached to at least one actuator 520, and, in the preferred embodiment, at least one actuator 520 is configured to move the suction device linearly towards the proximal end 2 of the gripping device. One or more actuators 600 is in fluid communication with the suction device 500. The chamber wall 510 is also attached to at least one actuator 530 and is configured to move the chamber wall 510 linearly towards the distal end 1 of the gripping device from a resting position. At least one actuator 650 is in fluid communication with the at least partially sealed chamber 100 and allows the chamber 100 to be pressurised or depressurised. The linear motion of the chamber wall 510, linear motion of the suction device 500 and/or the pressurization/depressurisation of the at least partially sealed chamber 100 are contrived in such a manner as to cause the membrane 300 to be deformed from its resting state. At any one time, membrane 300 deformation can be controlled dynamically using any combination of the chamber wall actuator, suction device actuator or fluid communication actuators and an appropriate control scheme. The distal end 1 of the suction device 500 is terminated in a suction area 400 that may be configured for improved object contact. An illustration of the distal end of the gripping device can be seen in FIG. 2.

In the preferred embodiment, the suction area 400 is defined by the radius of a suction cup where the suction cup may have bellows. In the preferred embodiment, the suction device 500 is also attached to at least one force sensing device 700. In the preferred embodiment, at least one sensor may be located within the suction device 500 and the suction device 500 is configured to allow the passage of cables, wires, or tubing.

Figure 3:
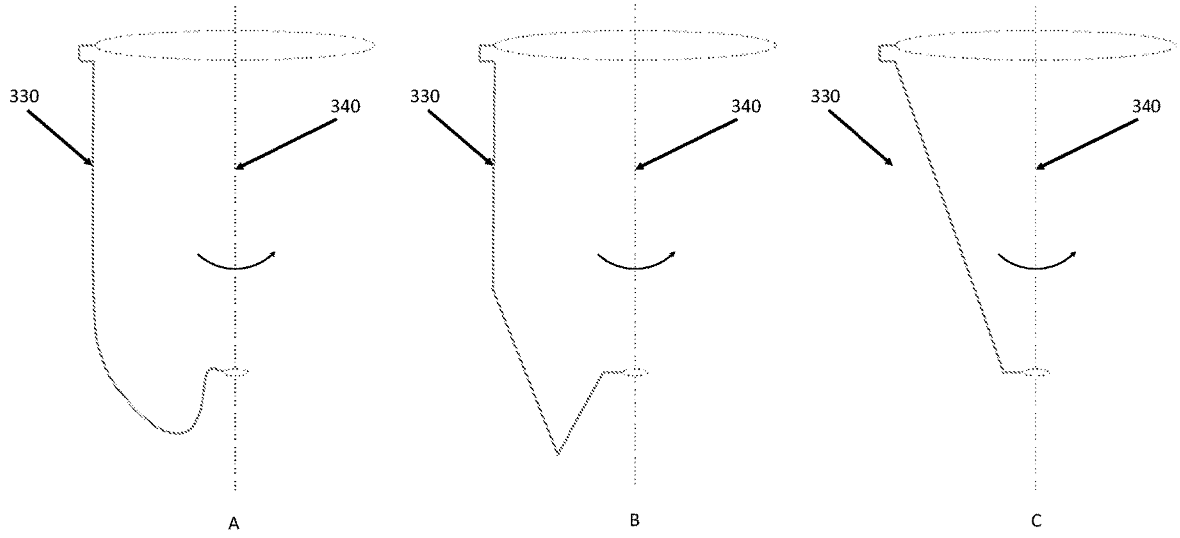
FIG. 3 are examples of how the surface of the membrane can be described by a continuous curved line revolved around an axis.
Figure 4:
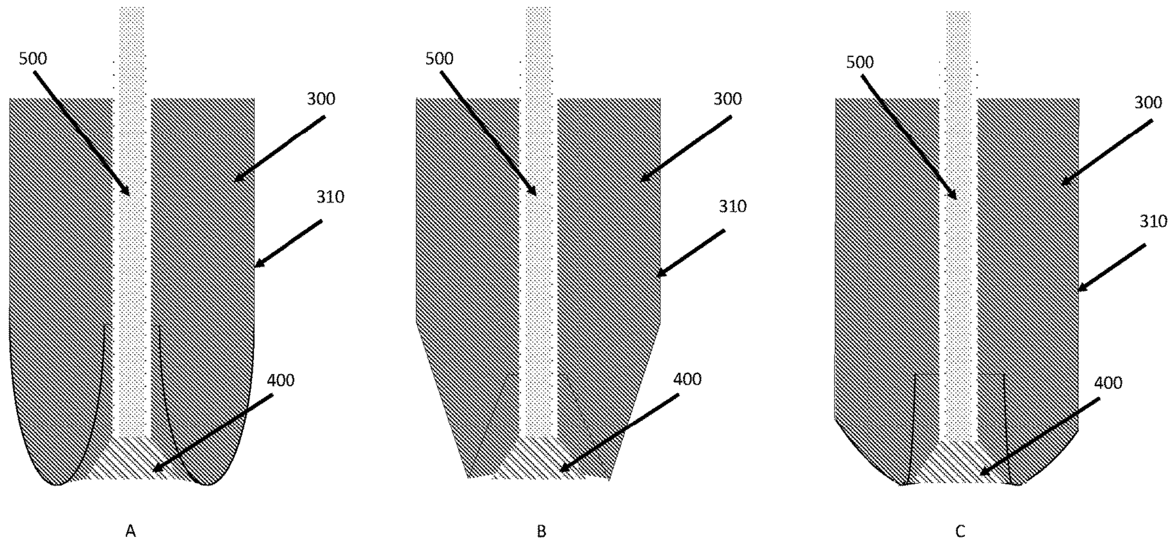
FIG. 4 are cross-sectional examples of pre-deformation membrane shape.
Figure 5:
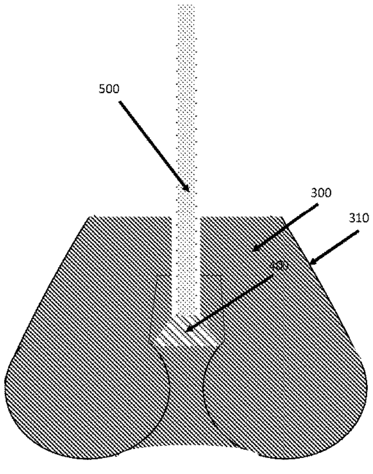
FIG. 5 are cross-sectional examples of the deformed membrane.

In the preferred embodiment, the membrane surface 310 in the resting state has a volcano-like shape where the membrane surface 310 is formed by a continuous curved line 330 revolved around an axis 340 as illustrated in FIG. 3. The continuous curved line 330 may be described by the following mathematical functions: linear, quadratic, power, logarithmic, polynomial, rational, exponential, sinusoidal, semi-circular, semi-elliptical, parabolic, hyperbolic, a line with a continuous derivative, or a piecewise continuous combination of any of the previous functions or any other mathematical function. When the actuators attached to the membrane 300 and chamber wall 510 are activated, the membrane 300 deforms and the membrane surface 310 shape will change as the attachment points move (ie. Chamber actuator 530 or suction device actuator 520) or as the pressure within the at least partially sealed chamber 100 is increased or decreased as illustrated in FIG. 4 and FIG. 5. The resulting deformed membrane surface 310 can still be described by one or more of the following mathematical functions as a continuous curved line revolved around an axis: linear, quadratic, power, logarithmic, polynomial, rational, exponential, sinusoidal, semi-circular, semi-elliptical, parabolic, hyperbolic, a line with a continuous derivative, or a piecewise continuous combination of any of the previous functions or any other mathematical function. At times, the actuated membrane surface 310 may assume the shape of a semi-toroid, semi-ellipse, semi-circle, a cone, a truncated cone, semi-rectangular etc.

In the preferred embodiment, the membrane 300 is composed of an elastic material that may be composed of, but not limited to, silicone, latex, urethane, polyurethane, any combination of these materials or any other suitable elastic material. The membrane 300 may be composed of multiple layers of the same or different materials. Portions of the membrane 300 may be reinforced with additional layers of material to increase the thickness, enhance the surface features of the membrane 300, direct the membrane 300 expansion in a desired direction or stabilise a fluid-pressurised membrane 300 while the gripping device is undergoing large accelerations and velocities. The membrane 300 may have regions with decreased or increased friction, hardness, density, elastic modulus, viscosity, 100% modulus, tensile strength, tear strength, elongation at break, specific gravity, specific volume, shrinkage, temperature, UV absorption or reflection, IR absorption or reflection, X-Ray absorption or reflection, refractive index, resistivity, radiation shielding, thermal conductivity, dielectric strength or dielectric constant, relative permittivity, permeability, susceptibility, acoustic impedance, acoustic attenuation or transmission, or any other material property not listed explicitly here. The membrane 300 may be composed of, or have regions coated with, a material that is suitable for handling food or hazardous materials. FIG. 4 shows cross-sectional views of examples of the gripping device with the membrane surface 310 in the neutral or relaxed position. FIG. 5 shows cross-sectional views of examples of the gripping device with the membrane surface 310 in a deformed state (no object in contact with the membrane).

Figure 6:
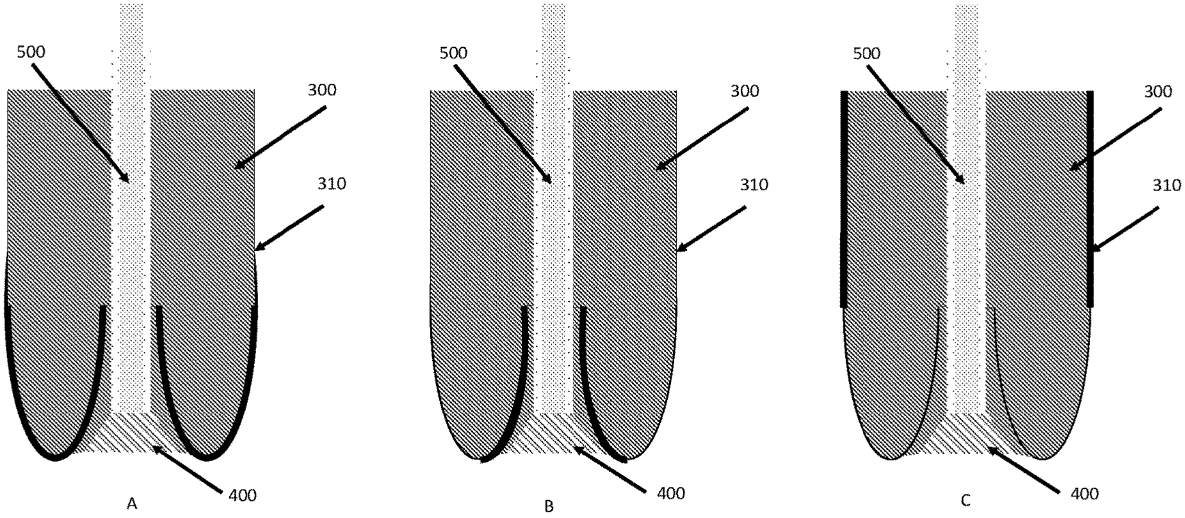
FIG. 6 are examples of a membrane with variable thickness.

In the preferred embodiment, the membrane 300 may have regions with increased or decreased thickness such as is shown, for example, in FIG. 6 which may restrict, encourage, or direct membrane 300 deformation. In one embodiment, the region of the membrane 300 near the suction device may have an increased thickness to prevent the membrane 300 from deforming in such a manner as to restrict or partially restrict flow near the suction device. Furthermore, utilizing a thicker membrane 300 in this region may also restrict membrane 300 deformation in such a manner as to prevent the membrane 300 from rubbing or contacting the suction device in an undesired way resulting in reduced friction and rubbing between the membrane 300 and the suction device.

Figure 7:
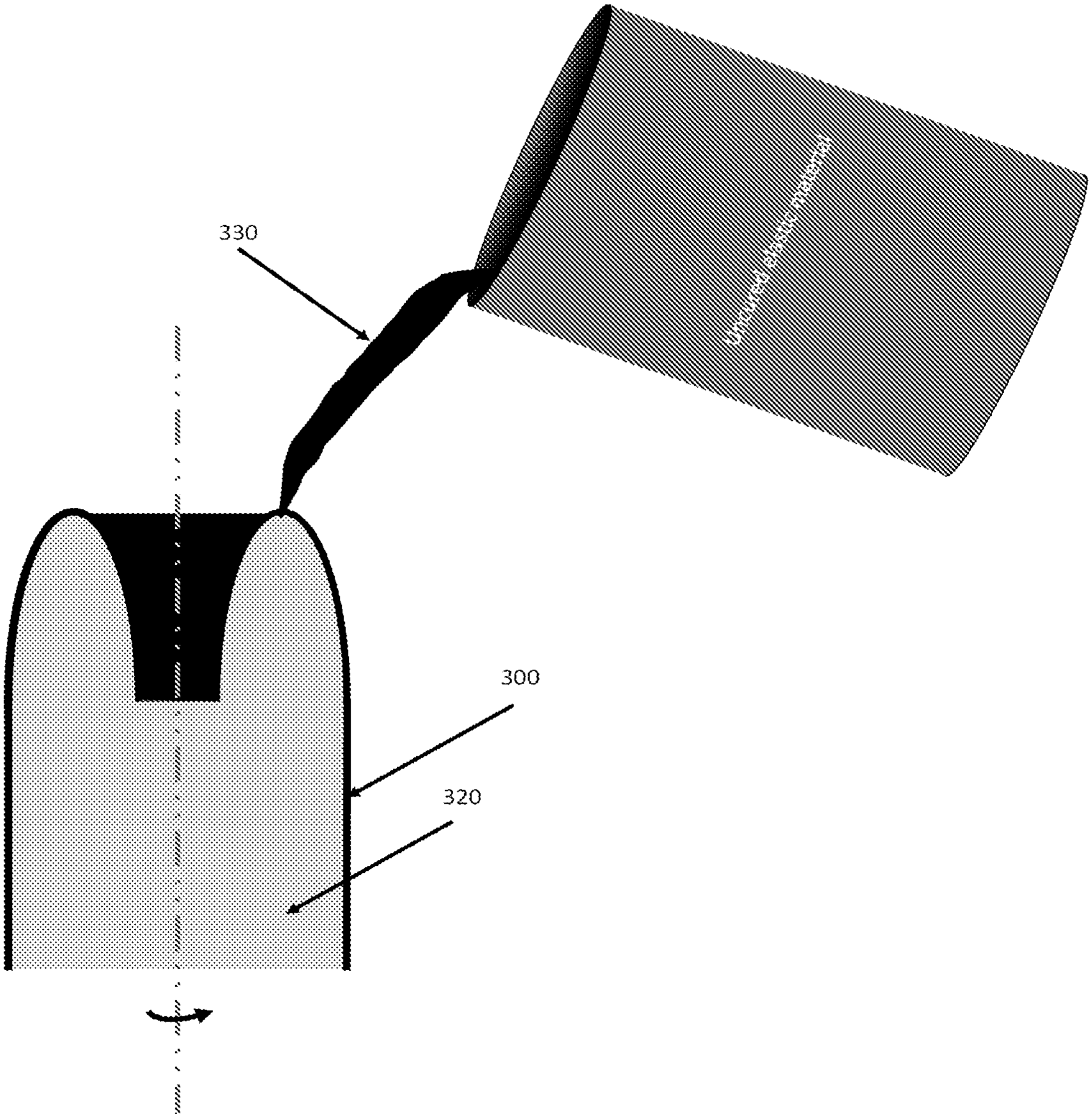
FIG. 7 is a diagram illustrating casting a membrane on a rotating mould.

In the preferred embodiment, the membrane 300 is fabricated by pouring the liquid elastic material 330 onto a rotating mould 320 before the material is cured as is illustrated in FIG. 7. The mould 320 is situated so that the elastic material is poured onto the distal end first in the region of the rim of the volcano-like surface. During the curing process, the mould remains on a rotating stage and curing of the elastic material 330 takes place within a carefully controlled environment where the temperature, humidity and/or pressure are closely monitored. Additional elastic membrane 300 layers may be created by pouring more liquid elastic material 330 onto the previous membrane layer before, during or after curing the first layer. The pouring of the liquid elastic material 330 is carefully choreographed to ensure that the membrane 300 layers are consistent and start/stop in the correct locations.

In yet another embodiment, other methods of fabricating membrane 300s may be used such as, but not limited to, injection moulding, dipping or spray coating.

Figure 12:
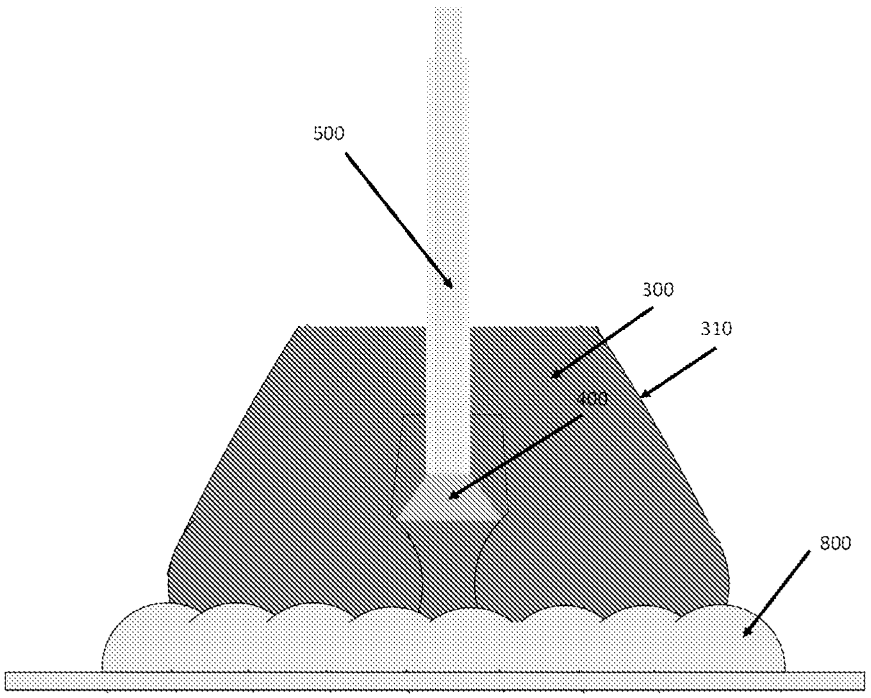
FIG. 12 is a gripping device grasping an item with a wavy or corrugated surface such as a blister packed-item.
Figure 13:
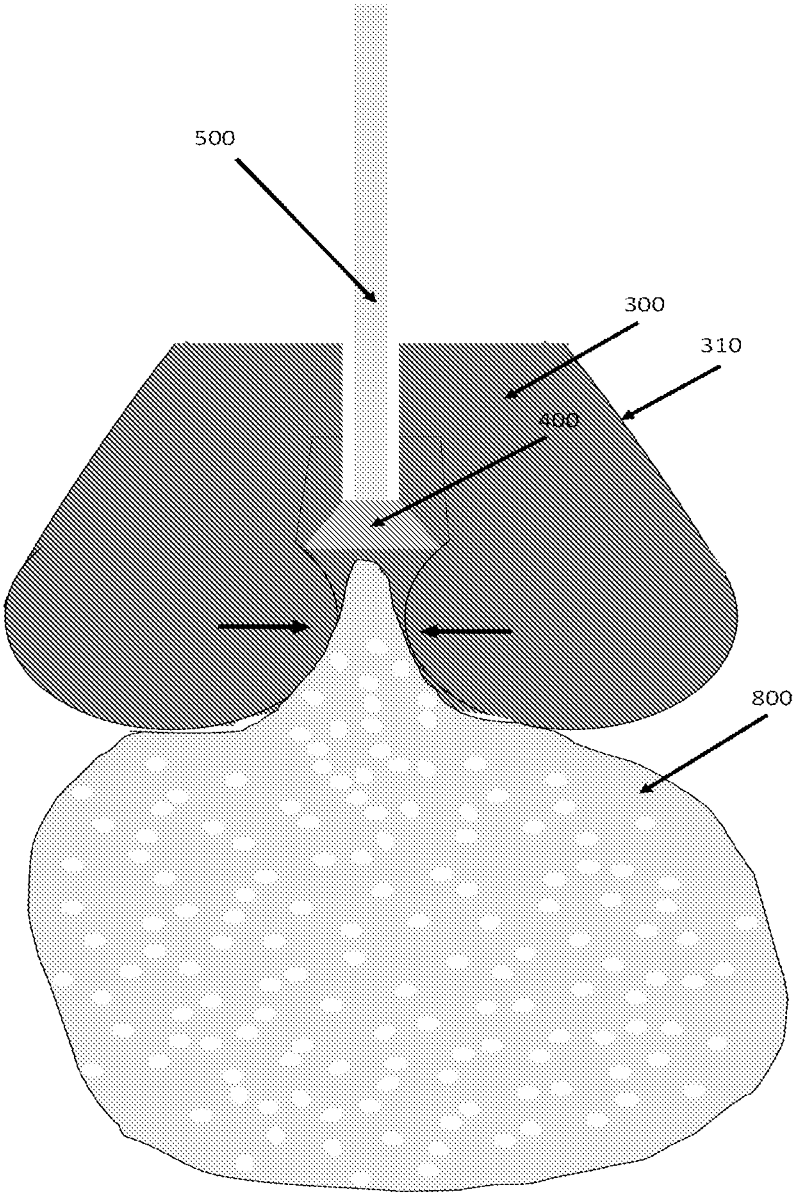
FIG. 13 is a gripping device grasping a porous and deformable item.
Figure 14:
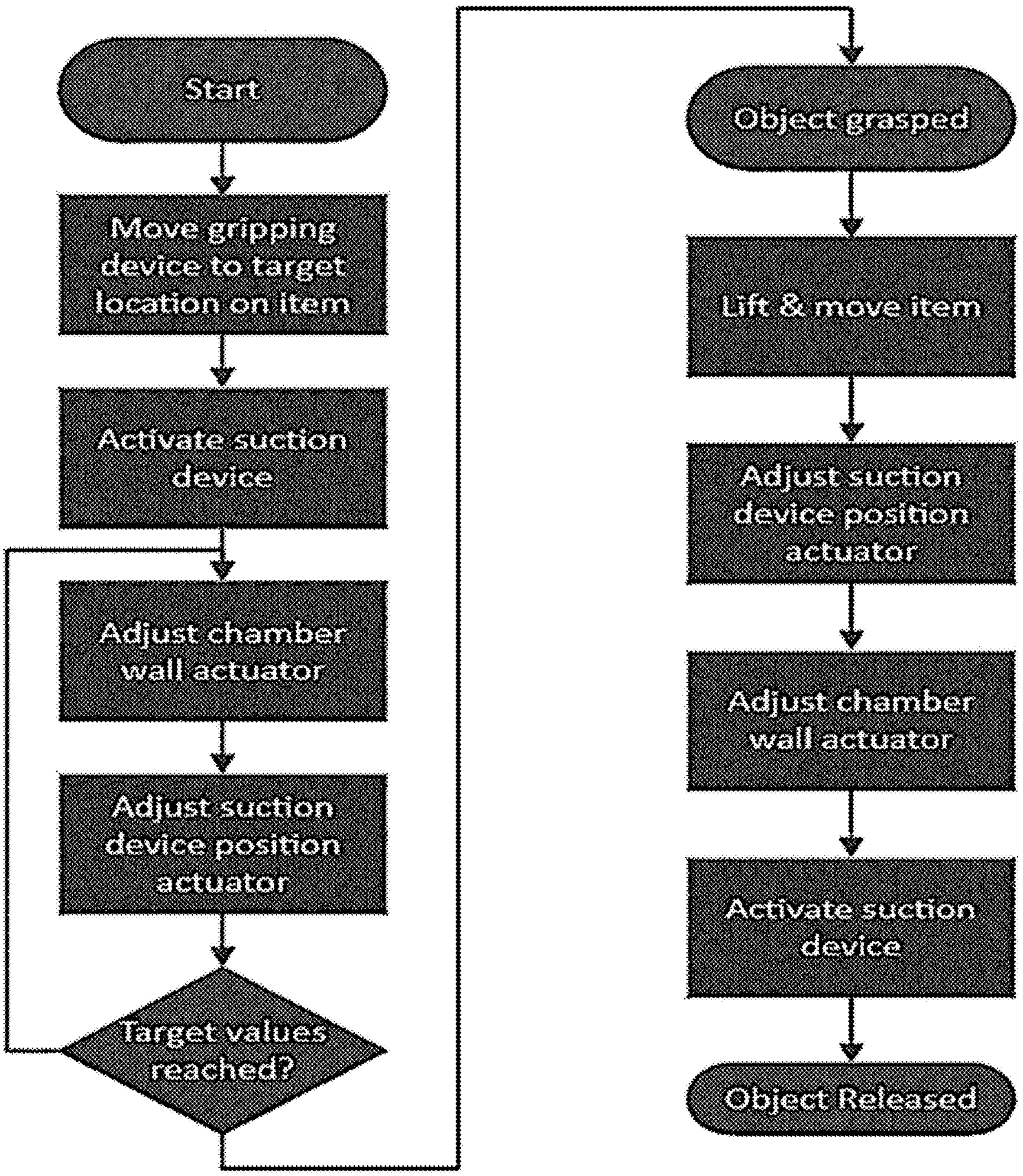
FIG. 14 is diagram illustrating the process of grasping and releasing an item.

In the preferred embodiment, grasping an item 800 is performed by bringing the suction device near to the surface of the item 800 using a robot, a robotic manipulator or some other means and activating the suction device through contact or proximity sensing or some other means. After activating the suction device, the membrane 300 is deformed in such a manner that the membrane 300 is brought into contact with the surface of the item 800. Dynamic control of the membrane deformation is performed by one of, or the combined actuation of, the at least one chamber wall actuator, suction device actuator and fluid communication actuator. When near or in contact with the item 800, the membrane 300 may form at least a partial seal with the item 800. This method is suitable for picking up an item 800 where at least a partial vacuum seal is possible such as a box or pill bottle. The at least partial seal formed between the membrane 300 and the item 800 results in a larger suction area 400 in contact with the item 800 than the suction device alone. In this way, the membrane 300 can act as a variable suction cup that can uniquely conform to whatever surface is presented and allows the gripping device to pick up items that have sharp edges, corners or corrugated or irregular surfaces as well as items with flat surfaces such as a box. Some examples of grasping items are illustrated in FIGS. 8-13. With at least a partial seal formed between the gripping device and the item 800, the item 800 can then be moved, manipulated, or displaced as needed. A flowchart describing one method of grasping and releasing an item 800 is illustrated in FIG. 14.

In other cases, such as with an item 800 that is porous such as a pillow, sock, loofah, or a mesh bag filled with one or more items such as, but not limited to, marbles, chocolates or limes, the surface of the membrane 300 may be brought into contact with the surface of the item 800 and, using friction between the membrane 300 and the surface of the item 800, draw the item 800 towards the suction device by dynamically controlling the deformation of the membrane 300. In the case of a larger item 800 such as, but not limited to, a group of limes in a mesh bag, the membrane 300 may be in contact with both the mesh bag and the surface of a lime. Regardless, the membrane 300 may form an orifice leading to the suction device. Further inflation of the membrane 300 can result in lateral forces being applied to the item 800 as the porous item 800 is drawn in towards the suction device creating a pinching action that allows the item 800 to be moved, manipulated, or displaced as is illustrated in FIG. 13. The suction device may or may not be activated while manipulating this type of item 800.

Figure 11:
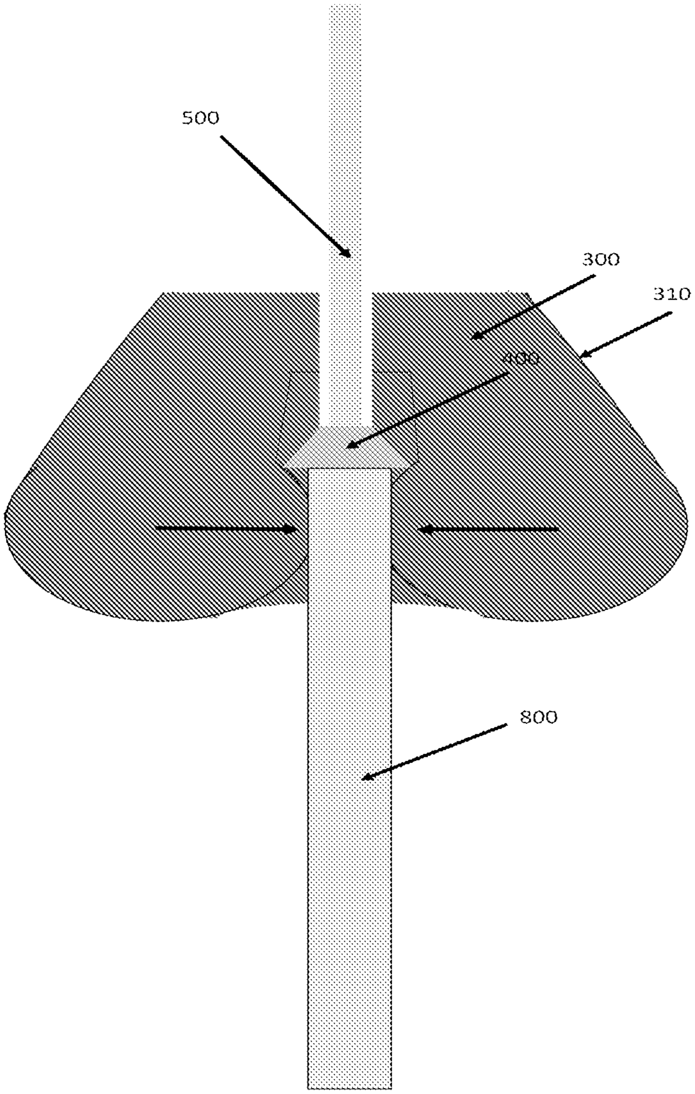
FIG. 11 is a diagram of a gripping device grasping a thin item where the membrane deformation applies lateral forces to the object.

In another case, the item 800 may present itself as a thin edge or item 800 such as, but not limited to, the edge of a credit card, the thin cardboard backing of a packaged item 800 such as batteries or pens or the stem of a tomato vine. In this case, the suction device is brought near to the thin edge and the membrane 300 is deformed such that the membrane 300 envelops at least a portion of the edge of the thin item 800. The membrane 300 may then be inflated as needed to provide a lateral pinching action to the thin item 800 allowing the item 800 to be moved, manipulated, or displaced as needed as is illustrated in FIG. 11.

Figure 8:
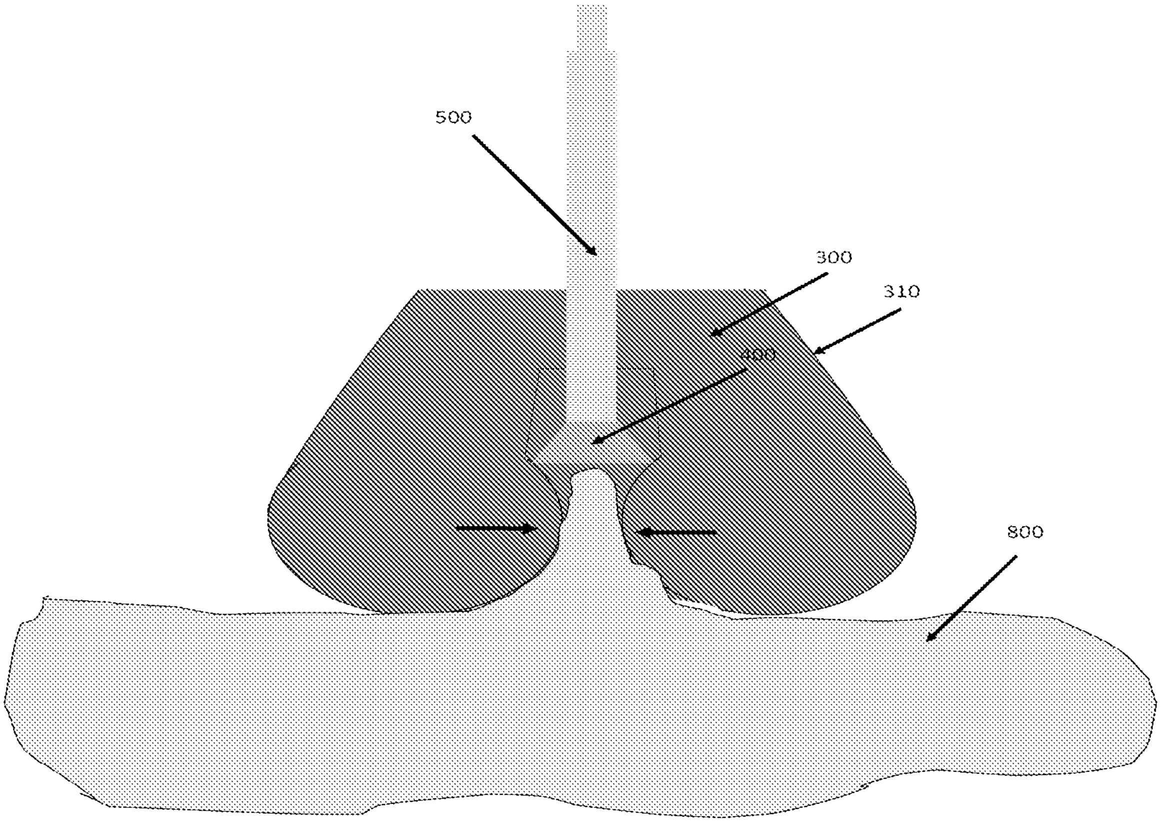
FIG. 8 is an example of the gripping device picking up a loosely bagged item where the bag is drawn into the suction cavity and the deformed membrane applies lateral forces to better grip the item.

In yet another case, the item 800 may be packaged in a bag. In this case, the suction device is brought near too, or into contact, with the bagged item 800 and then activated. The suction device may form a partial seal with the bag at this point. The membrane 300 is then deformed by adjusting the actuators to bring the membrane 300 into contact with the bag and form at least a partial vacuum seal between the membrane 300 and the bag. The suction device may then be moved to further deform the membrane 300 and create an orifice near the suction device. If the bag is loose or stretchy, the surface of the bag can be drawn into the orifice to create a better seal with the bag or, the membrane 300 may be further pressurised to laterally provide a pinching force to better grasp the bag as is illustrated in FIG. 8. If the bag is taut or not easily stretched, the suction device actuator may provide no or limited motion as creating an orifice near the suction device may reduce the grasping capability by causing the membrane 300 to detach from the taut or non-stretchy bag at least partially.

Figure 15:
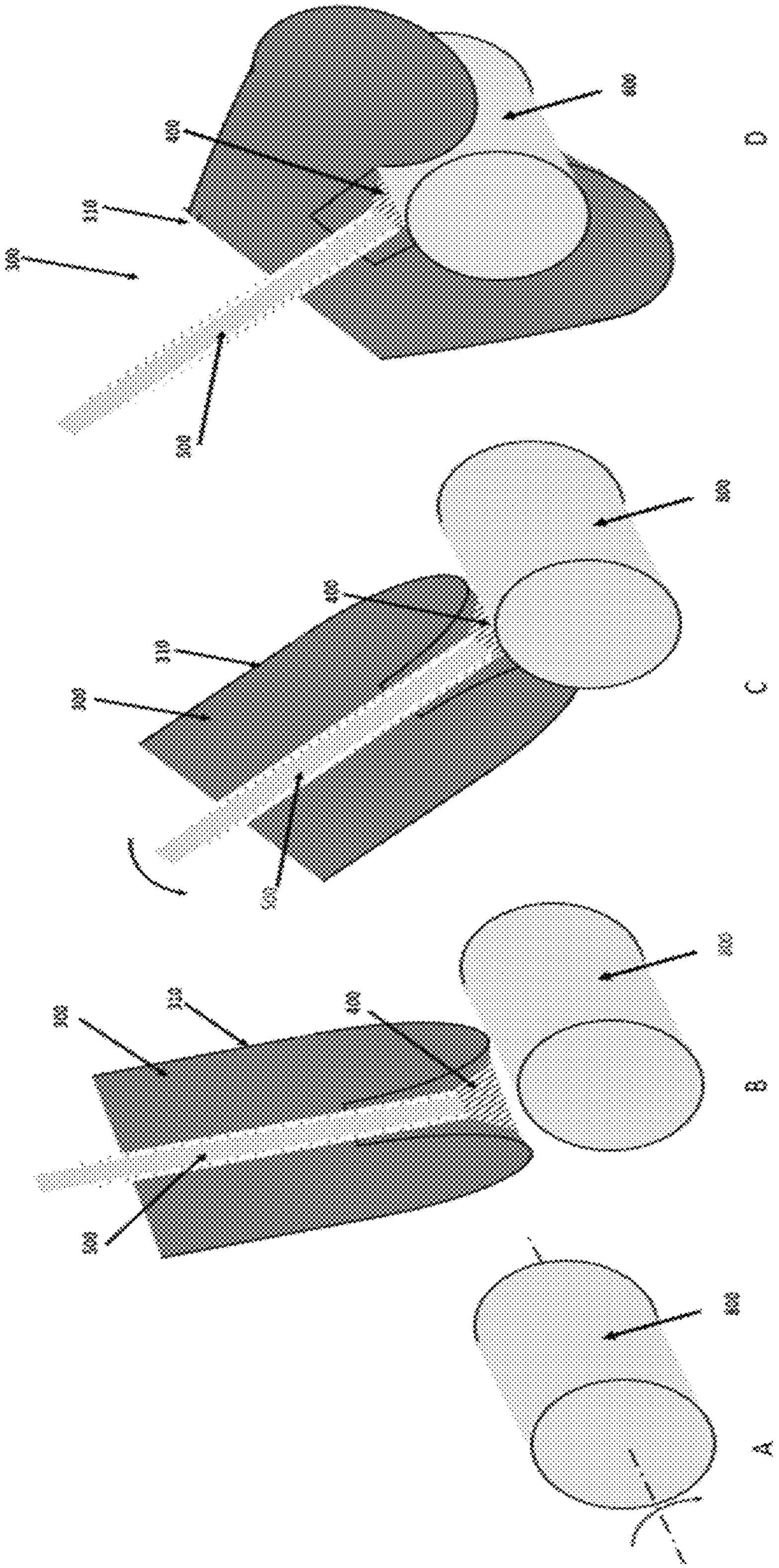
FIG. 15 is a diagram of a method to grasp a rolling object or preventing an object from rolling or sliding while grasping.

In the preferred embodiment, rolling, sliding or easily movable items may be grasped by pushing one section of the membrane 300 against the item 800 to hold it in place while the suction device 500 and chamber wall 510 are moved by their respective actuators 520, 530. The gripping device may be tilted and the remainder of the membrane 300 may then be deformed around the item 800 to create at least a partial seal which allows successful grasping. An illustration of this method of grasping may be seen in FIG. 15 where a small cylindrical item 800 is seen to be rolling or sliding (FIG. 15A) and a portion of the membrane is placed into contact with the item 800 to stop the motion of the item 800 (FIG. 15B). The gripping device may be then tilted so that that remainder of the membrane contacts the item 800 (FIG. 15C) before grasping the item 800 (FIG. 15D). Alternatively, placing a portion of the membrane in contact with a stationary item 800 first may prevent it from rolling or sliding during the grasping in the same manner as described above or as is shown in FIG. 15B-D.

Figure 18:
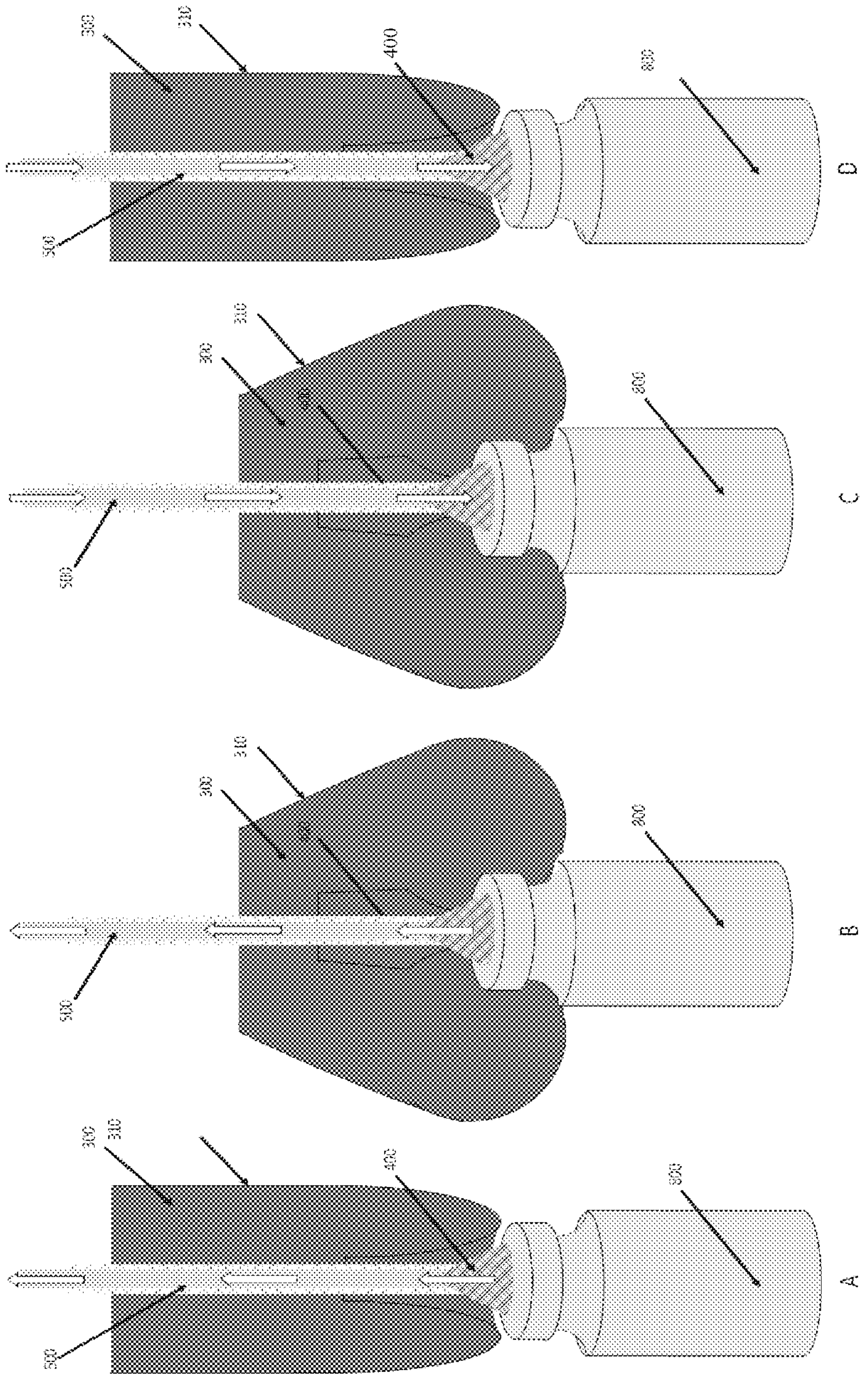
FIG. 18 is an Illustration of grasping an object by first contacting and activating the suction device before deforming the membrane around the surface of the item.

In the preferred embodiment, light movable items 800 may be grasped by first contacting the item 800 with the suction device, enabling the suction device 600 and then deforming the membrane 300 around the item to create at least a partial seal which allows successful grasping. The membrane 300 may be deformed to create an orifice around the suction device that, under further membrane 300 manipulation, further deforms the membrane 300 and draws the item further into the gripper. Further pressurisation of the chamber 100 at least partially sealed by the membrane 300 can be used to apply lateral gripping forces to the item 800 resulting improved grasping. This method has been illustrated in FIG. 18A-B.

In the preferred embodiment, when releasing an item 800, the suction device actuator 600 may be turned off or the fluid flow may be reversed allowing the membrane 300 to better separate from the surface of the item 800. At or near the same time, the membrane 300 deformation is reversed and the contact area between the item 800 and the membrane 300 is reduced as the membrane 300 reassumes its pre-actuated surface topology releasing the item 800. This method has been illustrated in FIG. 18 C-D.

In the preferred embodiment, the actuators connected to the chamber wall 510, suction device 500 and in fluid communication with the chamber 650 are controlled dynamically and the shape and at least partial pressurisation of the membrane 300 can be adjusted in real-time to optimize item 800 grasping. In order to dynamically control the actuators 500, 510, 600, 650 or inform the gripping device controller, sensors may be used to improve gripping, monitor a slew of environmental factors and conditions including, but not limited to, membrane 300 damage, gripping device troubleshooting or self-diagnoses. The sensors may be embedded on or within the membrane 300, the gripping device or the sensing devices may be located nearby, at or near a robotic picking station for example. Sensors may be used to monitor temperature, pressure, force, audio, fluid flow, absolute or relative position, magnetic field strength or position, proximity, acceleration, velocity, displacement, angular acceleration, angular velocity, angular displacement, or any other environmental factor. Sensors may also include those for GPS or similar position sensing, cameras or similar imaging or detection systems, infrared sensors, scanners, or detectors, laser sensors, optical fibers, ultrasound sensors, scanners or detectors, radio signaling including, but not limited to, Bluetooth, Wifi, WAN, Zigbee, LoRa, LoRaWAN, and RFID.

Figure 16:
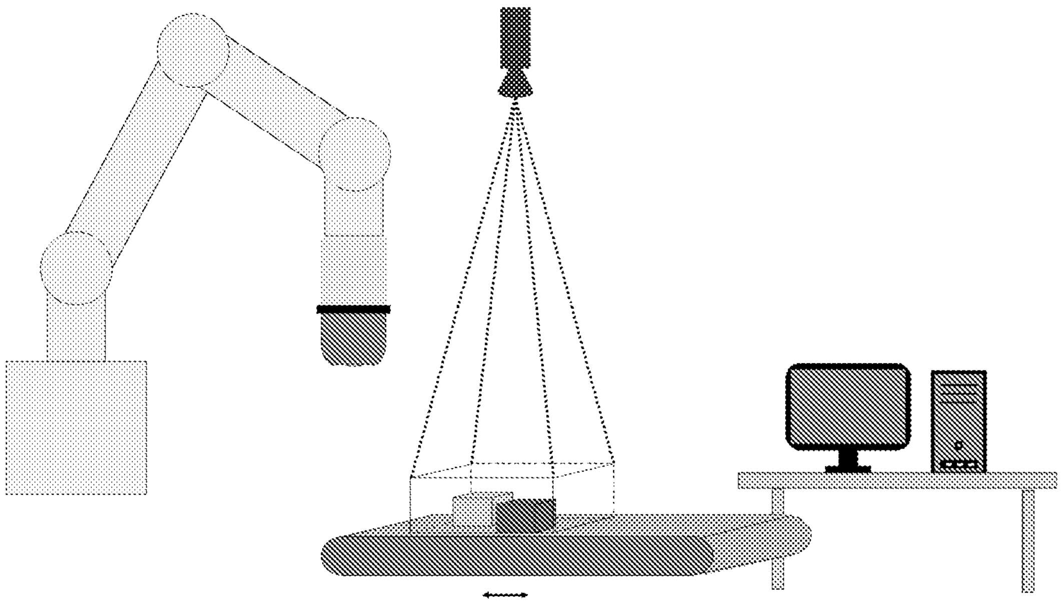
FIG. 16 is a diagram of a robotic picking station with a computer vision system.

In the preferred embodiment, the grasping device would be used as an end-effector on a robotic device used for grasping and manipulating items. For example, but not limited to, at a robotic picking station as is illustrated in FIG. 16. At the picking station, conveying systems may be used to bring the items, possibly in a bin or similar apparatus, to a suitable picking location. The items within the picking location area may be scanned by a camera or similar device or system to determine the location of the item 800 as well as a suitable picking location on the item 800 for the gripping device. The selection of the suitable picking location may be performed by an item detection system that could be configured to examine the surface geometry of the item 800. Examination of the surface geometry may be done using images, point clouds or similar surface detecting methods. A computer algorithm or set of algorithms may be used to examine the surface geometry or features and may evaluate and score different regions of the item 800 surface based on the geometry and features detected. The item scoring algorithms may be used to determine an abundance of item information that may be relevant to the picking station or gripping device including the optimal picking location based on the surface of the item presented or a probabilistic determination of the item type or surface. For example, the scoring algorithm could be used to inform the gripper that the item 800 is porous with low probability for suction adhesion or is an item 800 with a higher probability of suction adhesion such as a box. The gripper may then use the scoring system to provide the chamber wall 510 and suction device 500 actuators with a desired range of optimal positions or sets of positions. The item scoring system may also provide the at least one fluid communication actuator 650 with a desired pressure setting. The gripper actuators can then dynamically tailor the membrane 300 deformation to the item 800 for grasping. The optimal picking location may be determined by the surface features of the item 800, the relative positions of the robotic manipulator and nearby objects including other items, sensors, bin surfaces, walls, safety zones that exclude or restrict robot motion, tables, conveyors, or any other objects that could inhibit or restrict the grasping or manipulation of items. Once a picking location and grasp pose (orientation) has been identified, the gripping device can be maneuvered to the grasping location and pose. Once the gripping device is in place, the grasping action can begin as described previously. After the item 800 has been grasped, the item 800 may then be lifted, or otherwise manipulated, and released in the desired location. The desired release location may be on a table, bin, conveying device or any other suitable location. The suitability of the release location may be determined by an operator or an automated system using cameras or other sensing devices. During the movement of the gripping device, software algorithms may be used to ensure the gripping device is manipulated in a manner suitable for maintaining control of the item 800, collision avoidance and general safety of all items, sensors, equipment, and personnel.

In the preferred embodiment, a method of compensating for positional errors in the vertical direction due to a vision system or camera utilizes a sensor 700, possibly for measuring distance, force or pressure, may be attached to the suction device 500. For example, as the gripping device nears the item 800 to be picked, the gripping device monitors the force sensor 700 to detect when a sufficient contact force threshold has been achieved. The achievement of a contact threshold can be used by a motion control system to inform the robot to stop the motion of the gripping device and initiate the grasping process.

Figure 17:
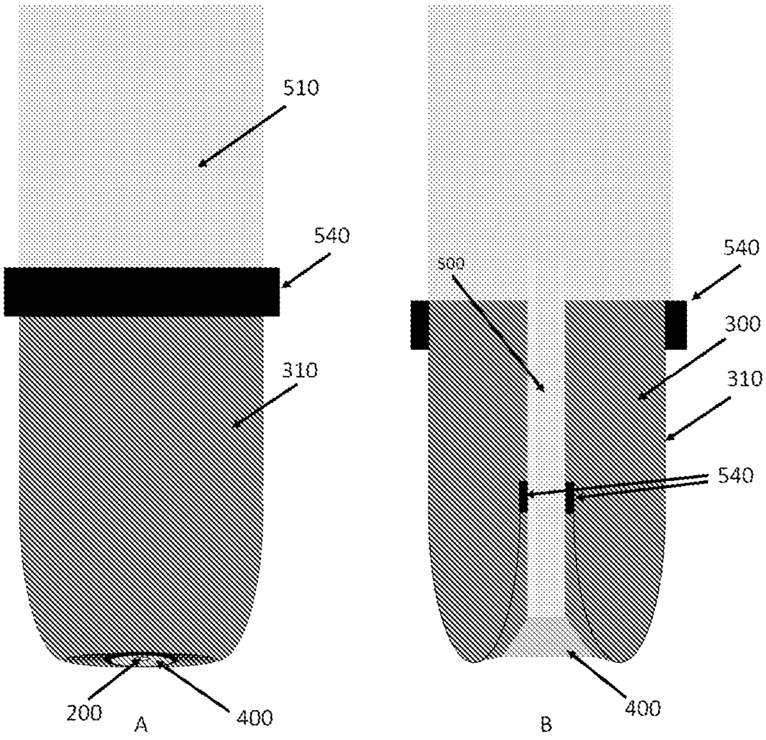
FIG. 17 is a diagram of the attachment device location used to attach the membrane to the chamber wall.

In the preferred embodiment, the attachment of the membrane 300 to either the chamber wall 510 or the suction device 500 may be contrived in many ways using an attachment device 540. The membrane 300 could be attached to the chamber wall 510 or suction device 500 using a solvent weld, glue, mechanical fastening methods such as, but not limited to, screws, clamps, bayonet clips, snap rings, hose clamps, spring bands, push-to-connect fittings, or acoustic welding. The location of an attachment device 540 used to attach the membrane to the chamber is illustrated in FIG. 17.

Figure 19:
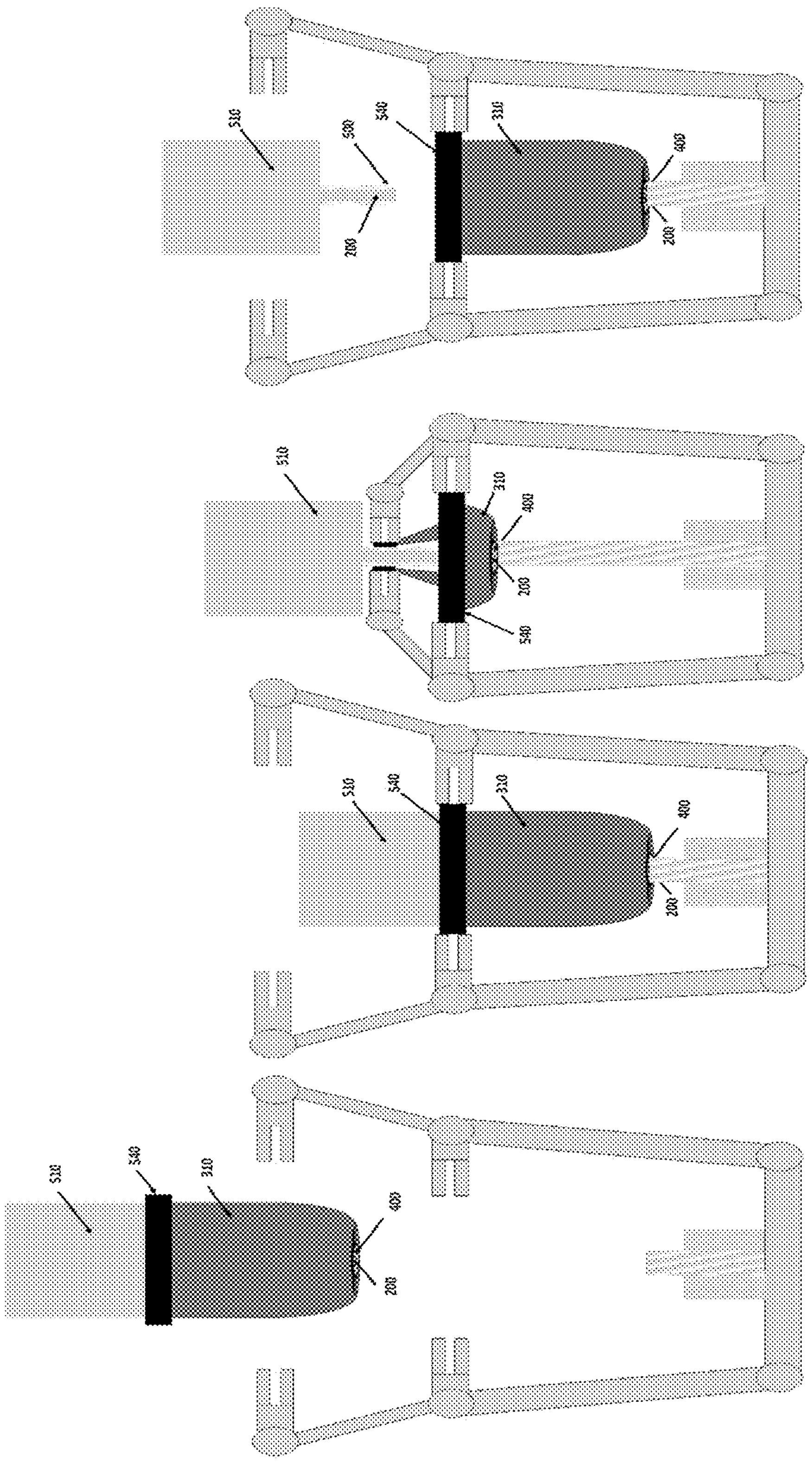
FIG. 19 is a diagram of a device for removing a membrane (A), unattachment of a membrane from the Chamber walls (B), unattachment of membrane from the suction device (C) and membrane and body of gripping device separated. Installing a membrane is the reverse of removal process (D).
Figure 20:
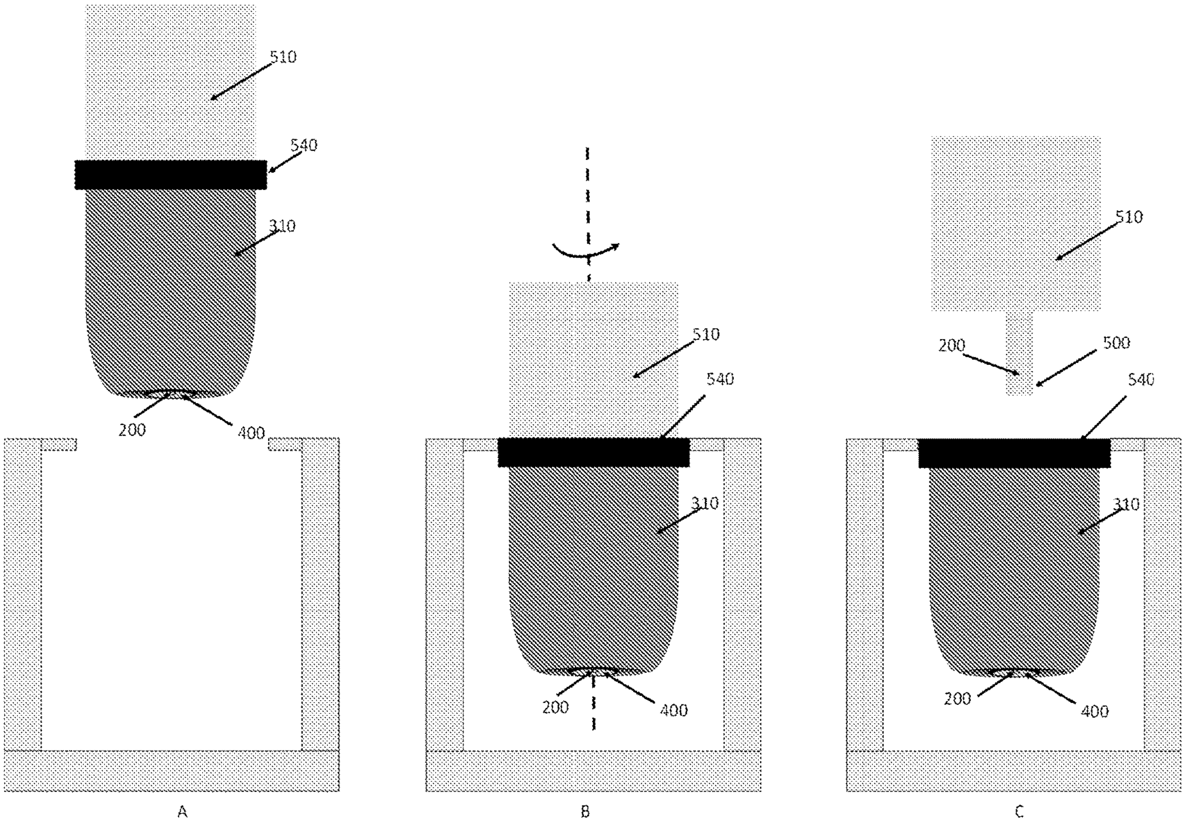
FIG. 20 is a diagram of a device for removing a membrane where the membrane is removed by rotating the gripping device or the membrane removal device.
Figure 21:
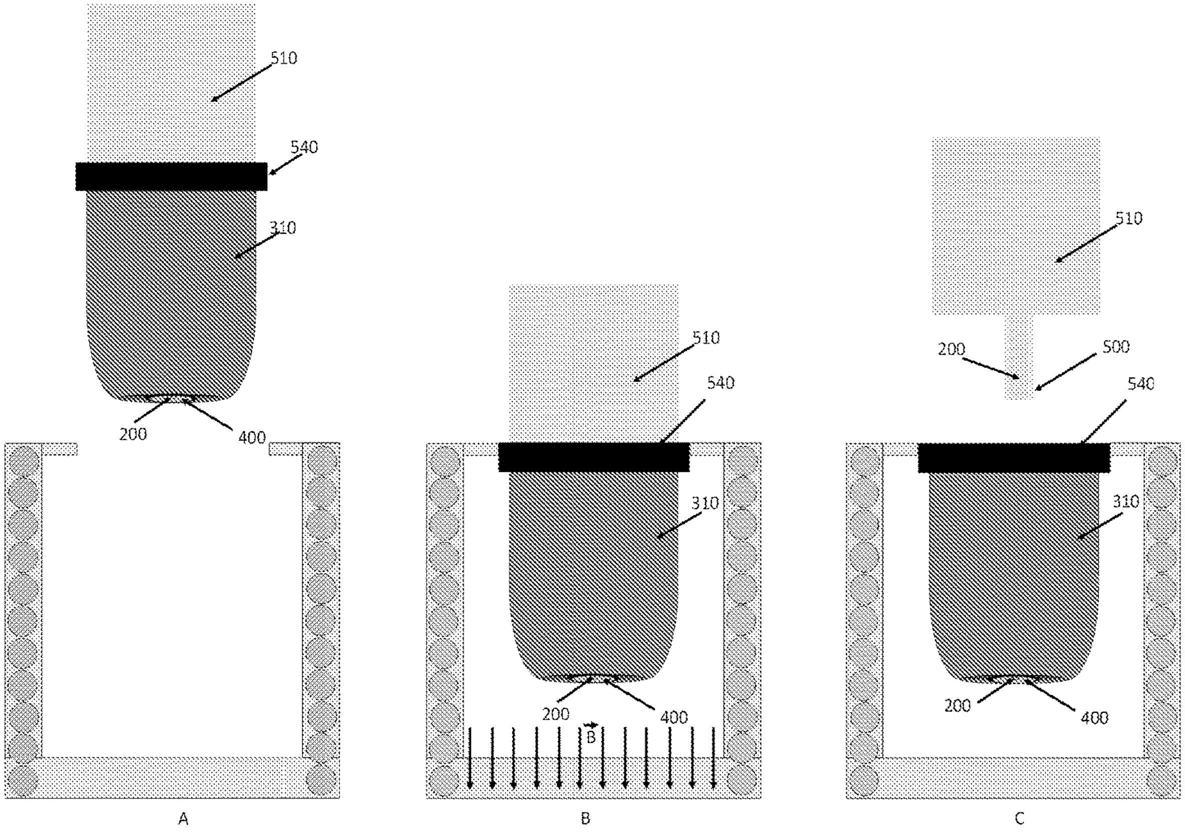
FIG. 21 is a diagram of a membrane removal device where the membrane is removed using a magnetic field generated by a coil.
Figure 22:
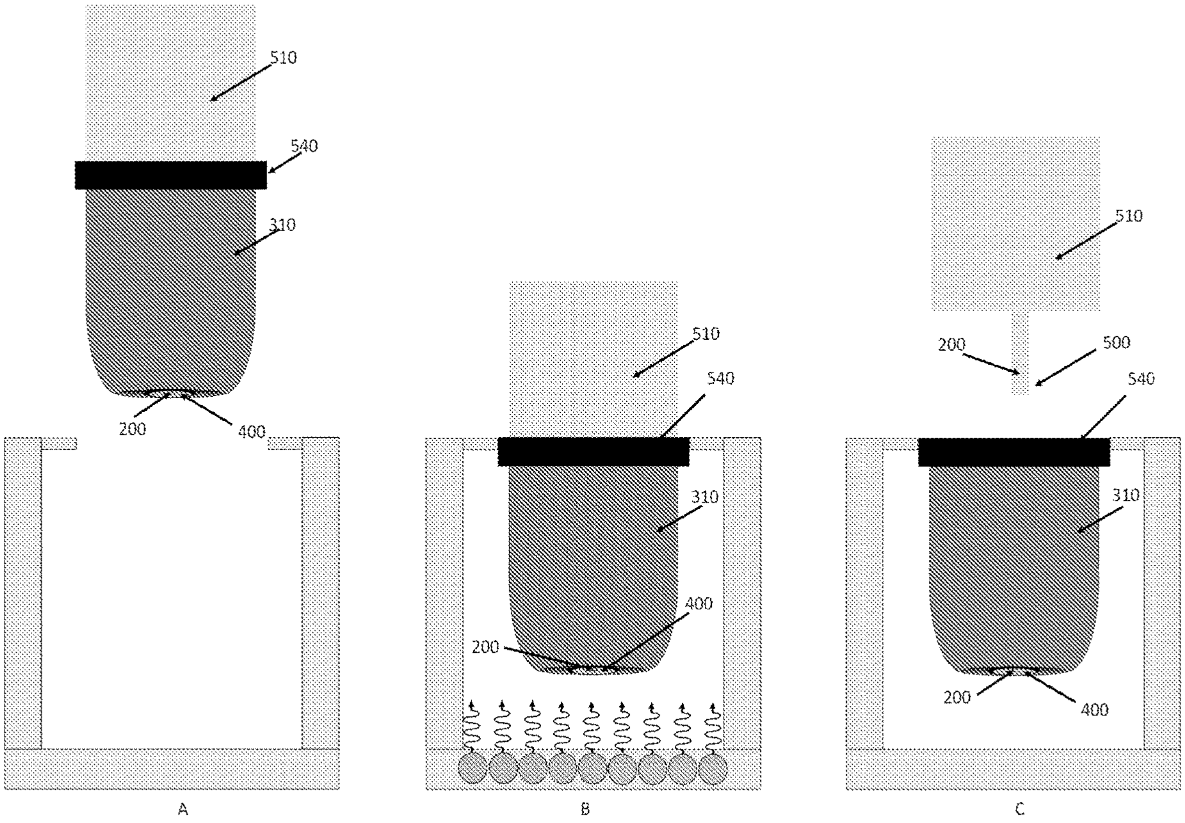
FIG. 22 is a diagram of a membrane removal tool that uses a heating element to weaken the bonding (e.g., Thermoplastic) between the membrane and the chamber wall or suction device.
Figure 23:
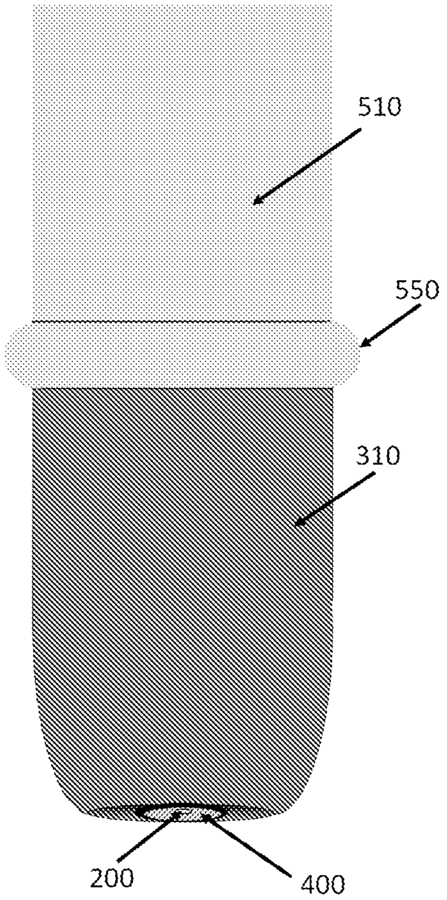
FIG. 23 is an illustration showing the general location of a cushioning material at the interface between the chamber wall and membrane.

In the preferred embodiment, the membrane 300 attachment method may be devised to enable an automated method for swapping membrane 300*s*. One method, as illustrated in FIG. 19, may be to have a membrane 300 change station with a new membrane 300 positioned ready for replacement. Actuators on the gripping device, built into the membrane removal station, or the robot to which the gripping device is mounted may be used to facilitate the removal of the membrane 300. One such method could include moving the gripping device to a membrane 300 removal station where, for example, the membrane 300 is mechanically grasped and the robot is used to twist the gripping device to remove a bayonet clip. Detaching the suction device could be performed, for example, by a tool designed to disconnect push-to-connect fittings. The motion of either the robot or the suction device actuator could facilitate the removal of the suction device. Attachment of a new membrane 300 could be performed, for example, by first inserting the suction device into the membrane 300 followed by pushing and rotating the gripper into a bayonet clip using a combination of the chamber actuator and/or robot.

In another embodiment, the membrane 300 may be replaced using a membrane removal tool that holds the membrane in position while the gripping device is twisted by, for example but not limited to, a robot. Alternatively, the membrane removal tool could be twisted.

In yet another embodiment, a membrane removal tool is used to remove or replace the membrane by applying a magnetic field to latch/unlatch the membrane connections, heat to glue/unglue a thermoplastic or similar material, force or pressure applied in a specific manner to remove or replace the membrane when the attachment at one or more positions is performed using a push-to-connect fitting, quick coupler, snap ring, retaining ring, cam lock, snap joint, lock nuts, barbed fitting, lever-lock, swivel bayonet, screw-type, latching, or similar quick connections. Various membrane removal methods are illustrated in FIG. 19-22.

Figure 38:
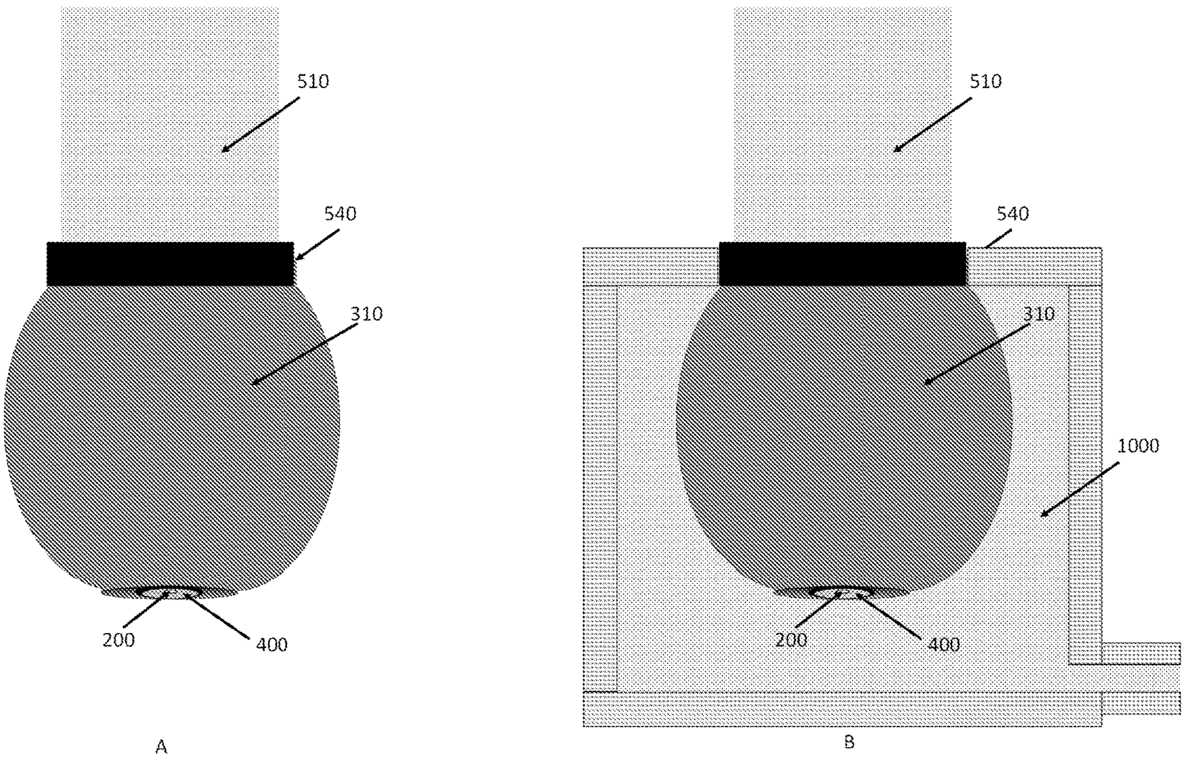
FIG. 38 is a diagram of inflating the membrane (A) to test for perforations (B) inside of a cavity.
Figure 39:
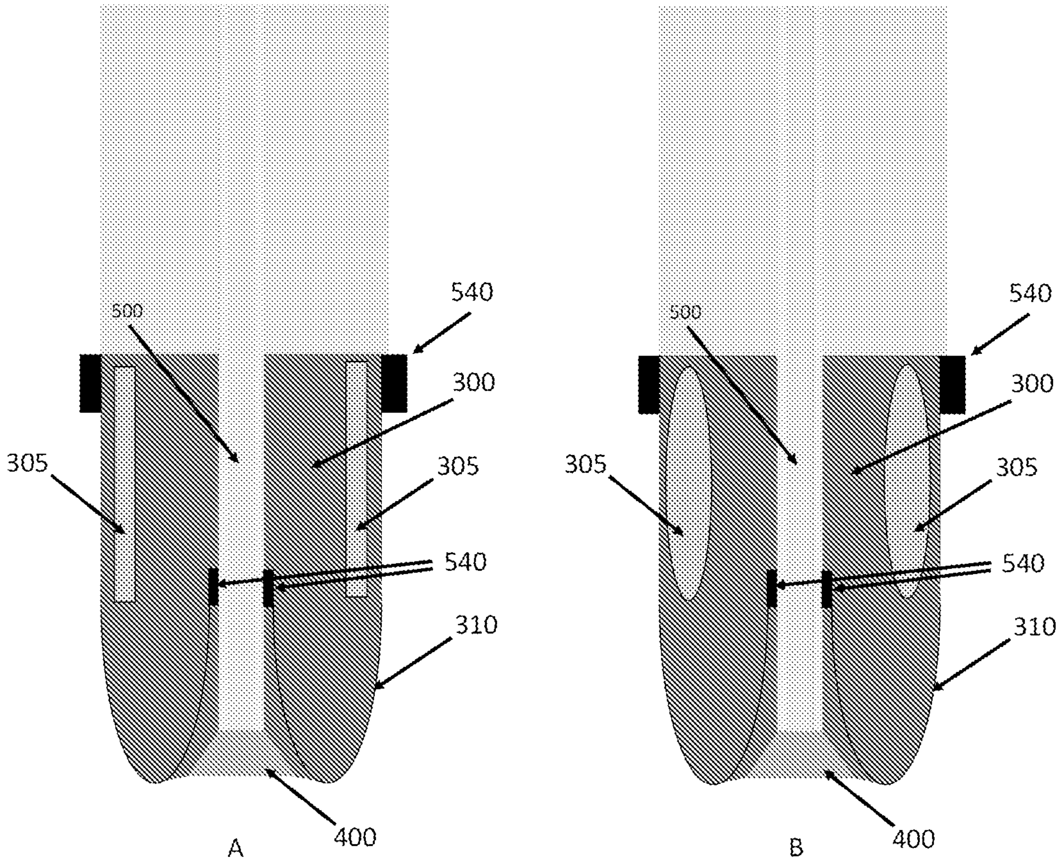
FIG. 39 is a diagram of bladders used to help stabilise the membrane during picking.

In the preferred embodiment, a method for detecting leaks, tears or holes in the membrane sealing the at least partially sealed chamber of the gripping device is described here. A test chamber is located near the picking station at which the gripping device is being employed. The test chamber has a sufficiently large hole in at least one surface large enough for the relaxed membrane to pass through without touching the edges of the hole. At least one additional hole in the test chamber allows the interior of the chamber to be in fluid communication with at least one sensor and at least one additional hole in the test chamber is terminated with a valve or actuator that can allow fluid communication with the interior of the test chamber. Most of the membrane, beginning with the distal end of the membrane is placed into the at least one hole while attached to the gripping device. The membrane is inserted into the hole until the attachment point between the chamber wall and membrane is near, or in contact with, the outer surface of the test chamber. The membrane is then pressurised and the expanding membrane forms at least a partial seal between the outer surface of the membrane and the test chamber while the fluid within the at least partially sealed test chamber is vented via the valve. After the membrane expansion has stopped due to the achievement of the chamber target pressure, the venting valve is closed and the pressure within the test chamber is monitored while the target pressure is maintained. A leak is detected when the pressure within the test chamber increases as pressurised fluid from within the gripping device chamber is vented through the hole in the membrane into the test chamber. If there are no sufficiently large holes present in the membrane, the pressure within the test chamber remains relatively unchanged. An example of this process is illustrated in FIG. 38.

In the preferred embodiment, the region of the chamber wall 510 near the membrane 300 attachment point may be fabricated from, or coated with, a soft and/or low friction material 550 that reduces friction between the membrane 300 and the chamber wall 510 and absorbs or cushions any collisions or contact between the chamber and other objects In the preferred embodiment, the suction device 500 is attached to a tube 200 that passes through the chamber wall 510. The tube may be used to directly facilitate fluid communication between the suction device 500 and a suction pump or Venturi or, the tube may be used to allow the placement of sensors or the passage of wires or tubing to enter the at least partially sealed chamber 100.

Figure 24:
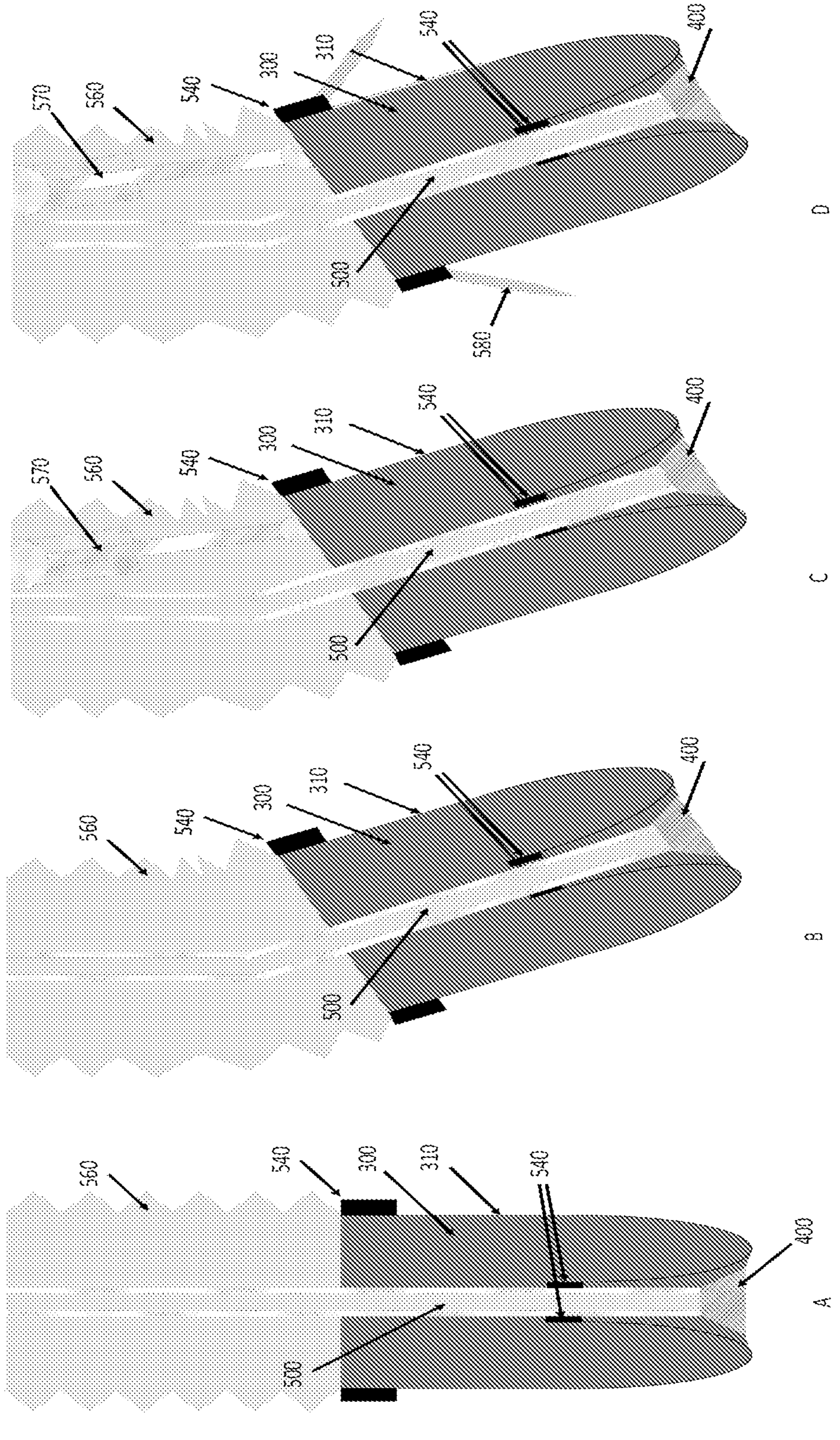
FIG. 24 is an illustration of the chamber wall formed by a bellows (A), passive motion of the chamber wall bellows (B), actuated motion of the chamber wall bellows (C), A soft compliant structure creates a larger suction area than that from the membrane or the suction device (D).
Figure 28:
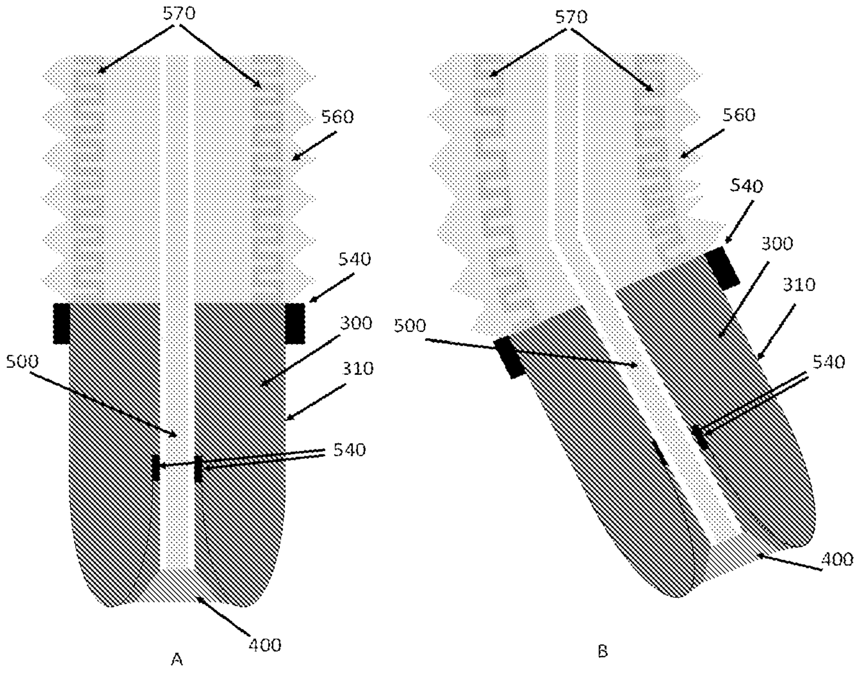
FIG. 28 is a diagram of a flexible chamber configured as a bellows with activation by fluidic actuator.
Figure 29:
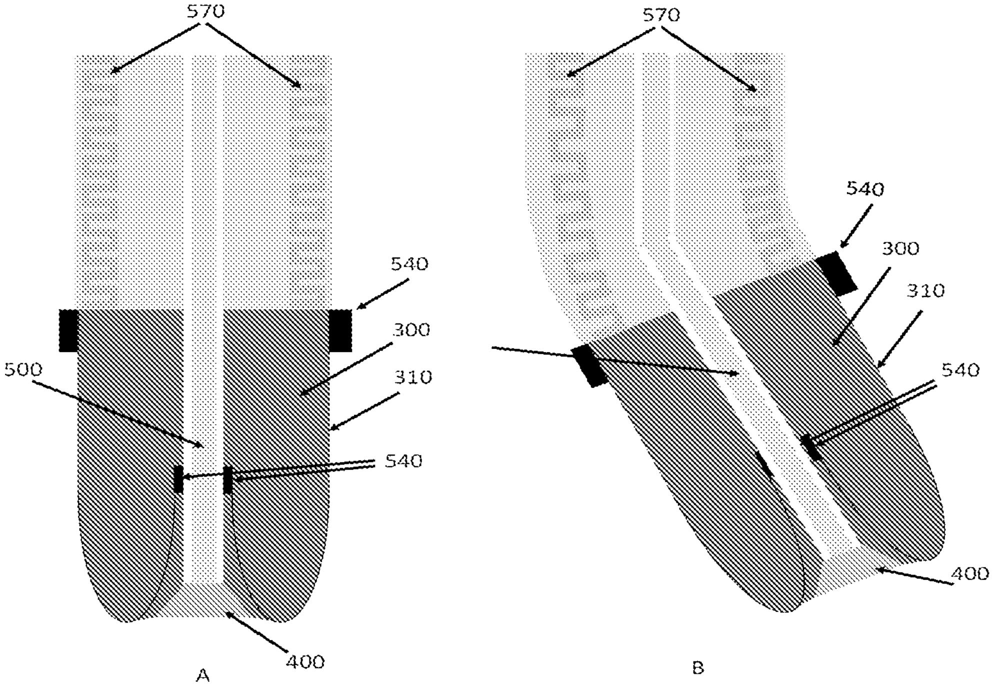
FIG. 29 is a diagram of a flexible chamber configured with activation by fluidic actuator.
Figure 30:
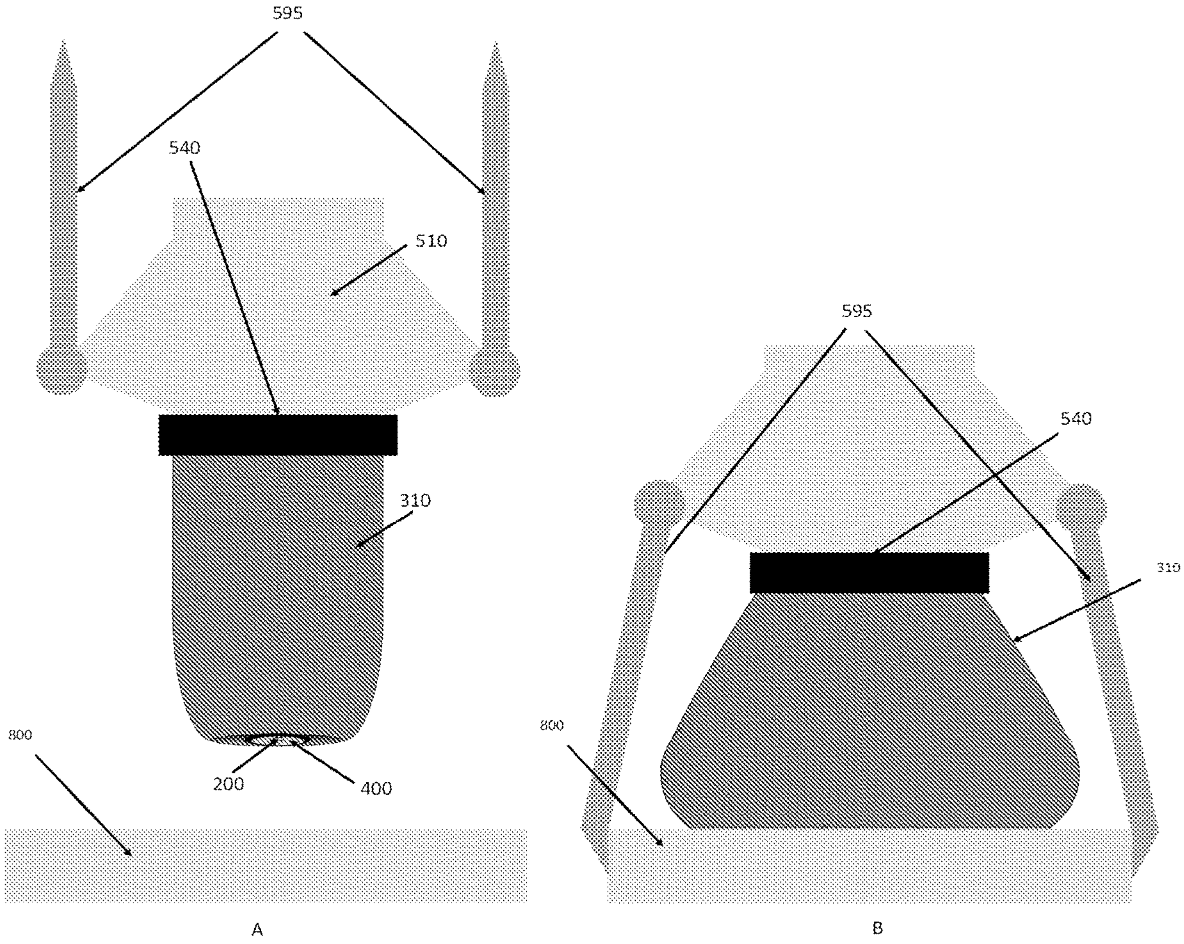
FIG. 30 is a diagram of a gripping device aided by mechanical "fingers".
Figure 31:
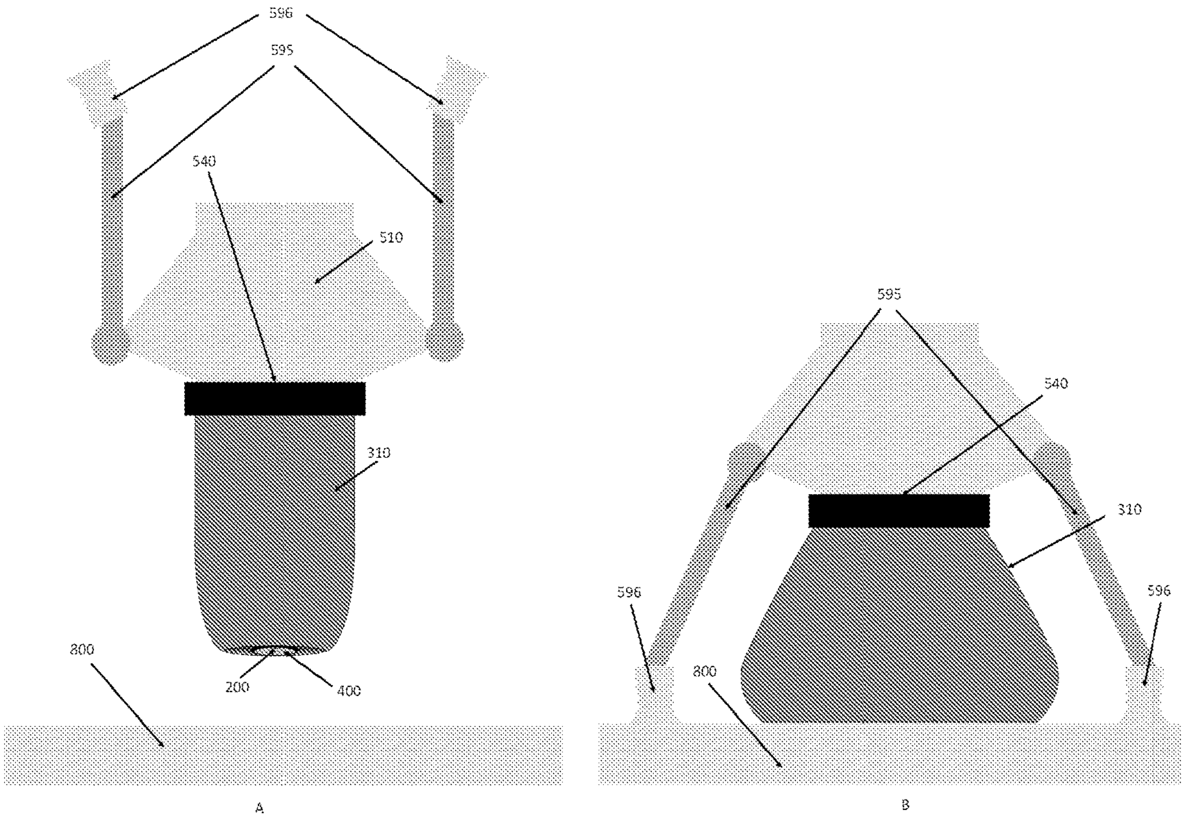
FIG. 31 is a diagram of gripping device aided by mechanical "fingers" with suction cups.
Figure 32:
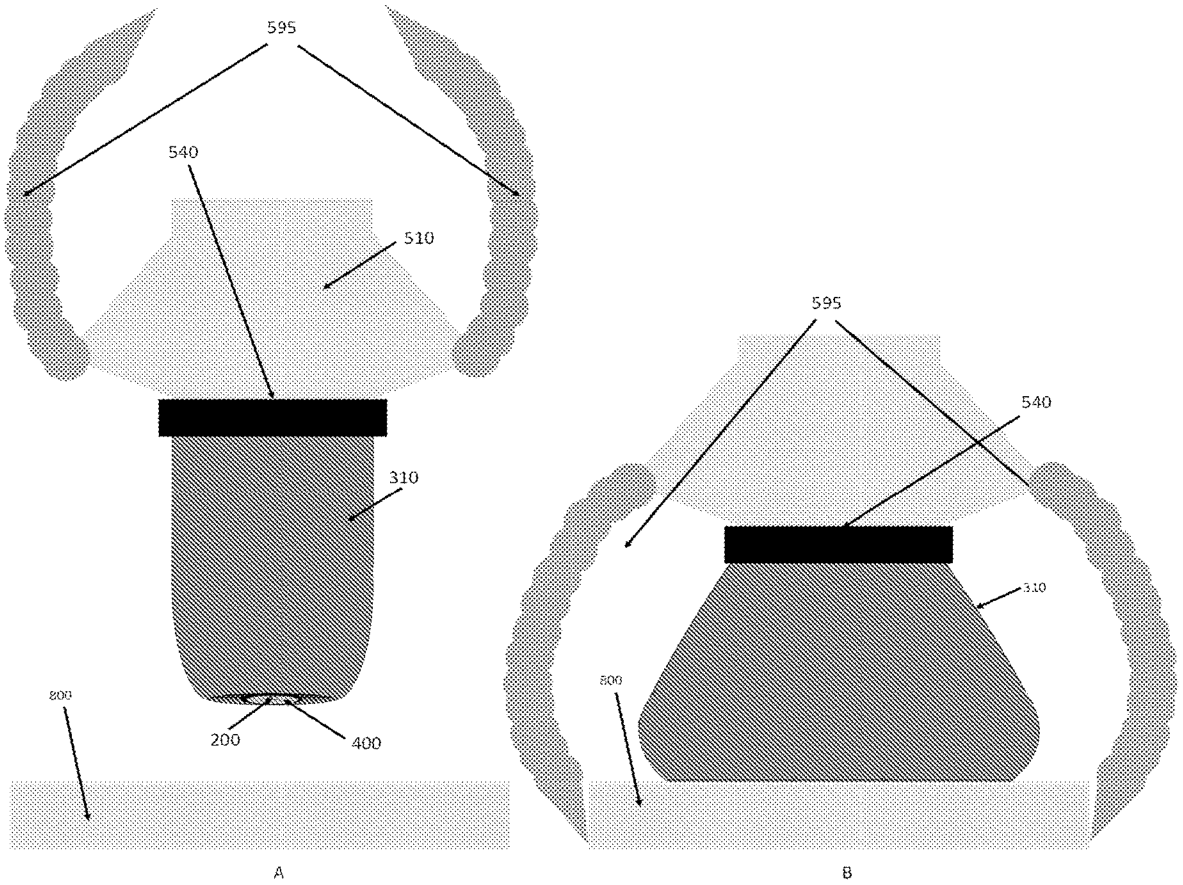
FIG. 32 is a diagram of a gripping device aided by fluidic actuators.
Figure 33:
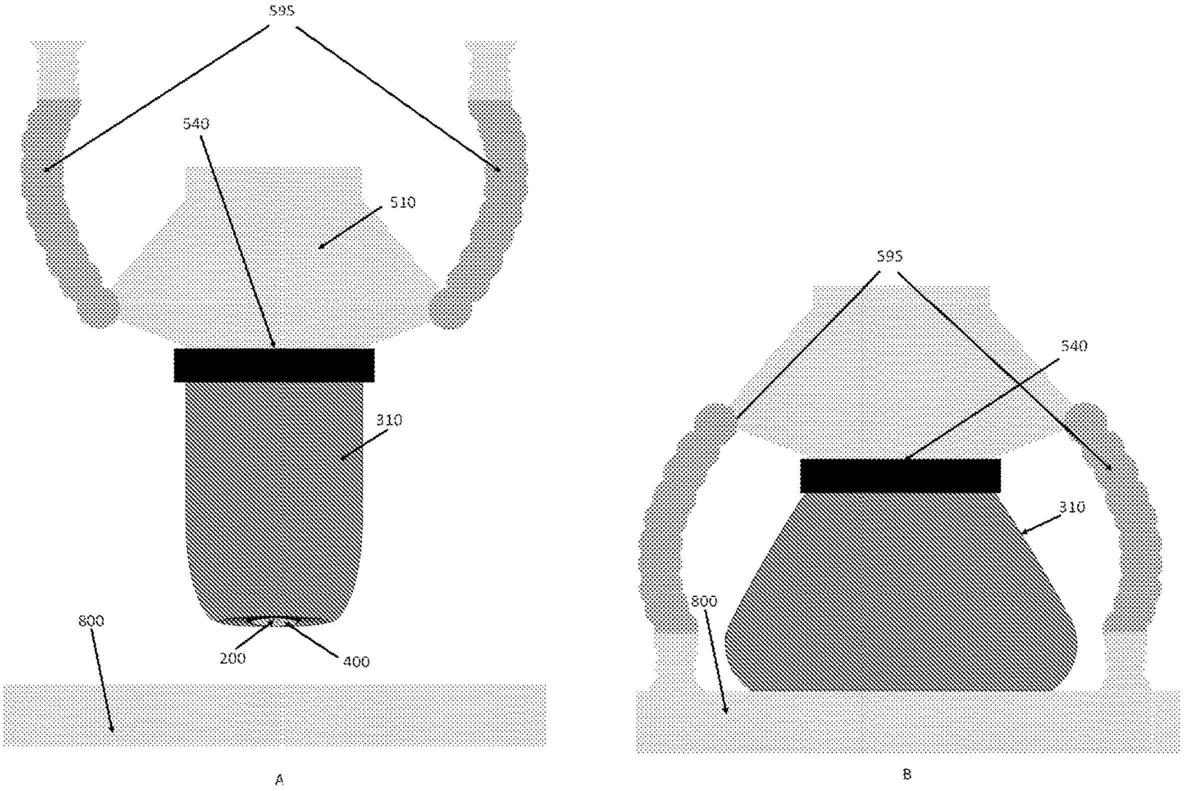
FIG. 33 is a diagram of gripping device aided by fluidic actuators with suction cups.
Figure 34:
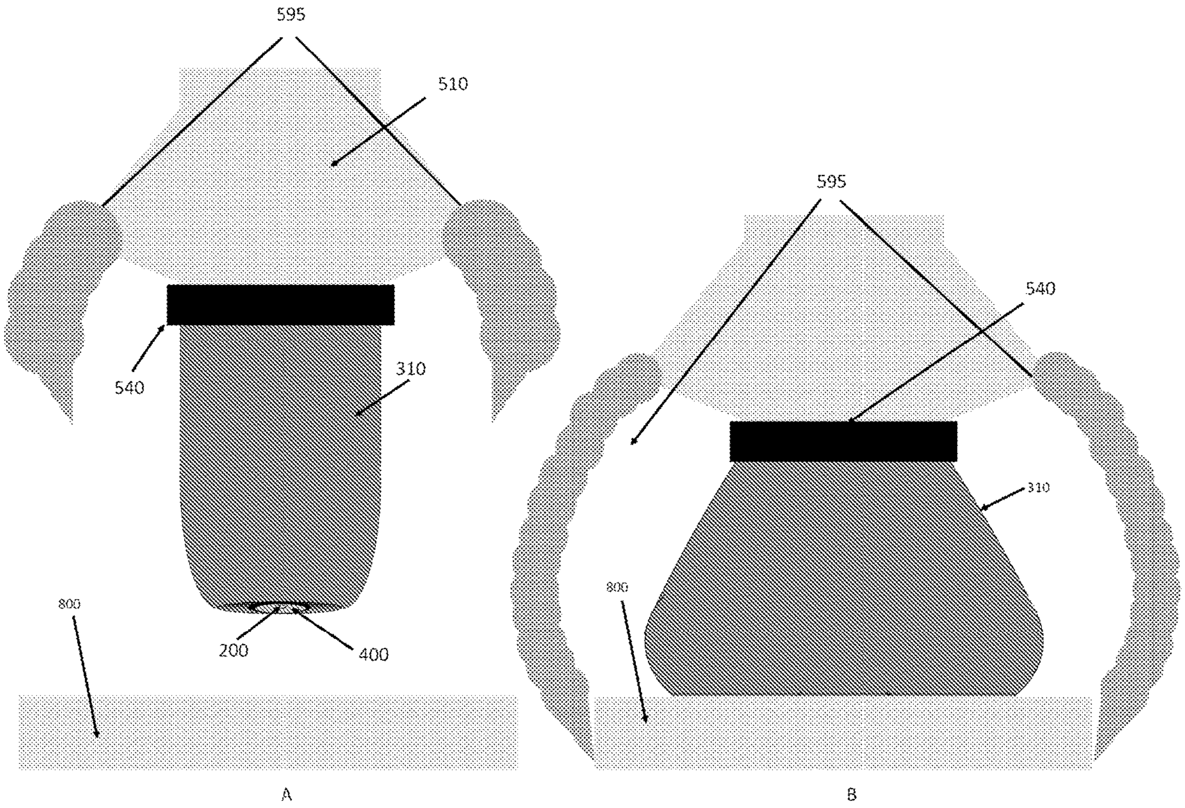
FIG. 34 is a diagram of deformable fingers that can elongate.
Figure 35:
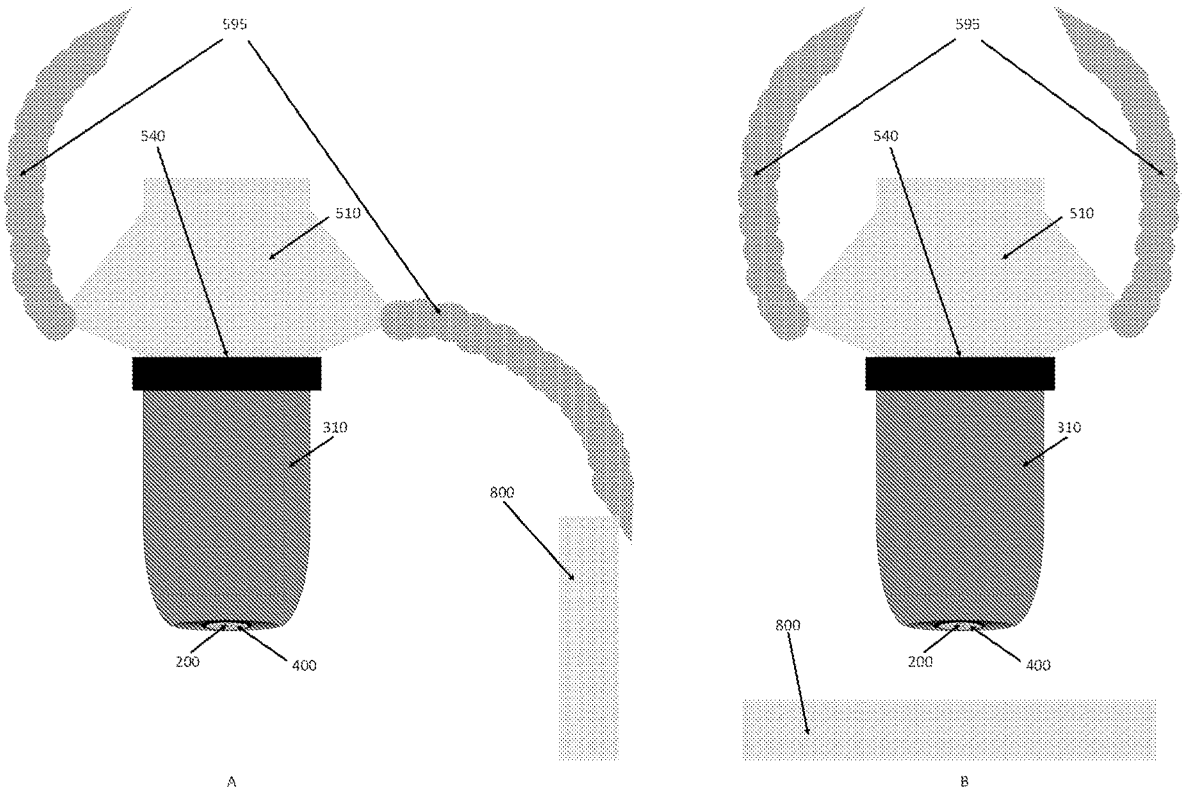
FIG. 35 is a diagram of using a "finger" to shift or move an object.

In another embodiment, the chamber wall 510 may be flexible with, perhaps, but not limited to, a corrugated structure or in the shape of a bellows 560 to allow the distal end of the gripping device to mechanically rotate and better comply to an object, especially in tight spaces where the chamber wall 510 may contact a bin wall or another item. The flexible chamber wall could be used either passively or actively to enable picking in hard-to-reach places such as the corner of a bin or provide an additional level of compliance when grasping objects. The suction device 500 may itself be bendable or composed of one or more rotational joints to allow the flexible chamber walls to adjust to an object. This would allow the chamber wall 510 to automatically comply to an object when attempting to pick items in tight spaces. Alternatively, the chamber wall 510 may have at least one actuator 570 to dynamically adjust the chamber length and/or tilt the chamber for approaching items. The at least one actuator could be actuated by pneumatic, electric, or magnetic means, by a cable driven means, by partitioning the chamber into sub-chambers and actively controlling the fluid pressure within the individual chambers. Examples of this are illustrated in FIG. 24 and FIG. 28-29

Figure 40:
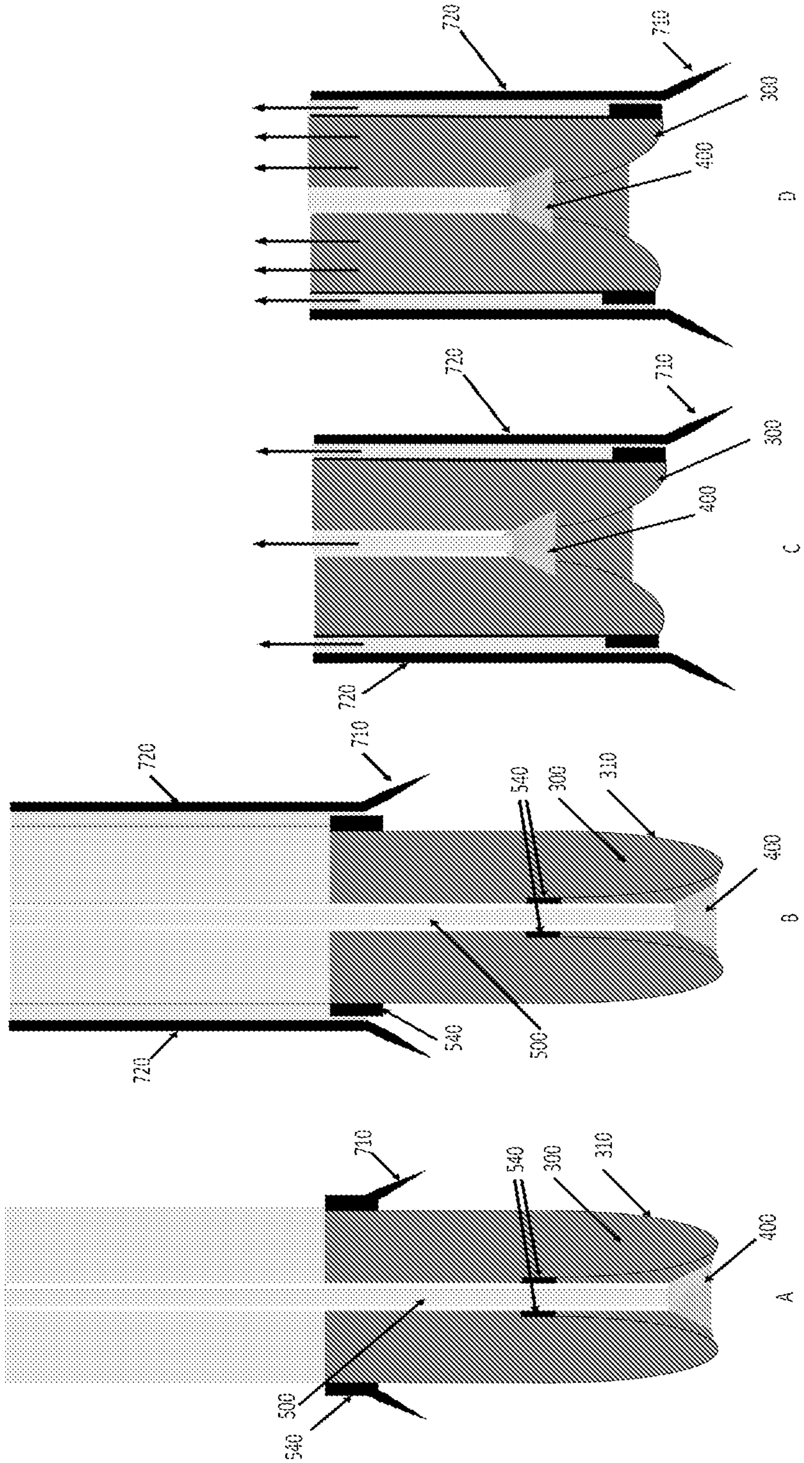
FIG. 40 is a diagram of external suction cup which relies on the suction device (A), external suction device with its own suction device (B), activated gripper with suction device retracted, chamber extended, and vacuum suction being routed through both the suction device and the outer suction device (C) or suction routed to the chamber to pull the membrane back and to the external suction device (D).
Figure 41:
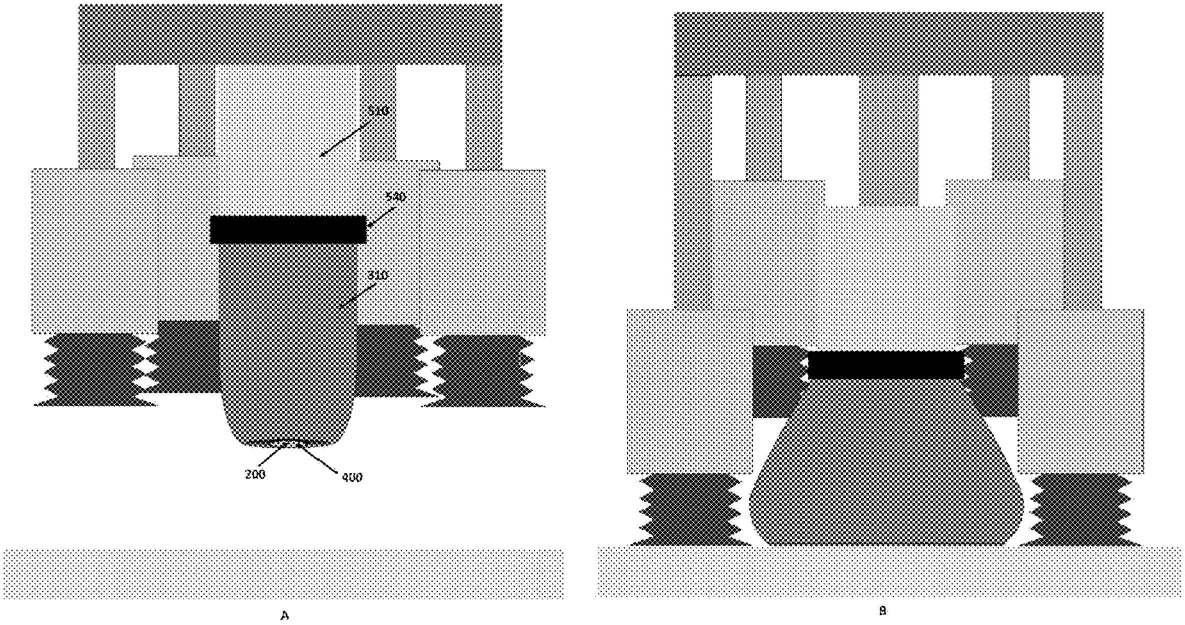
FIG. 41 is a diagram of a gripping device aided by an array of suction grippers A) before gripping and B) after gripping.
Figure 42:
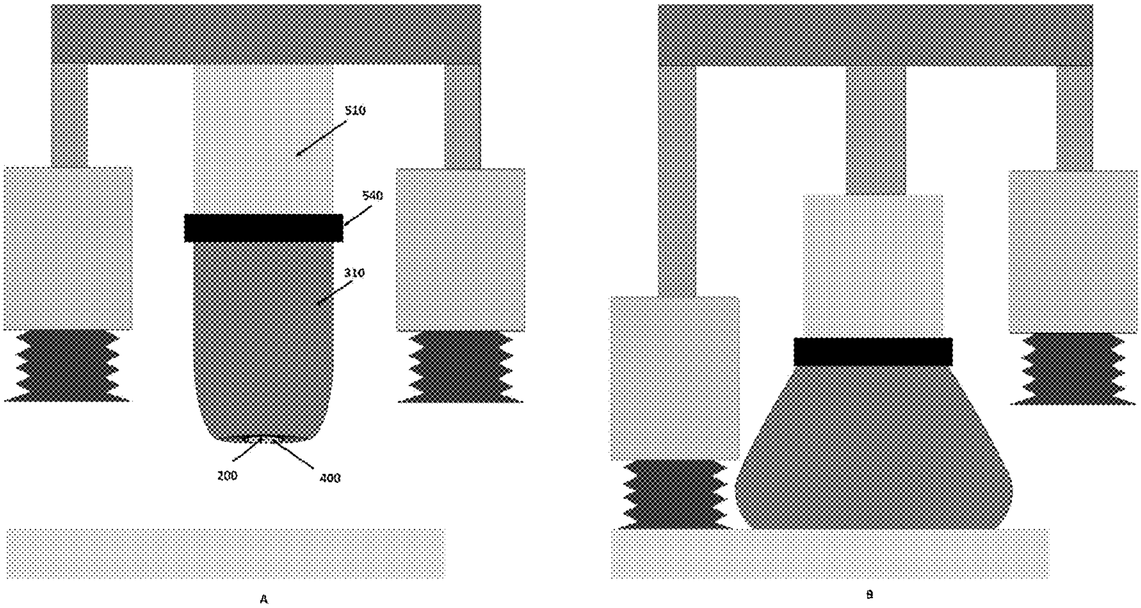
FIG. 42 is a diagram of a gripping device aided by additional of suction grippers A) before gripping and B) after gripping.
Figure 43:
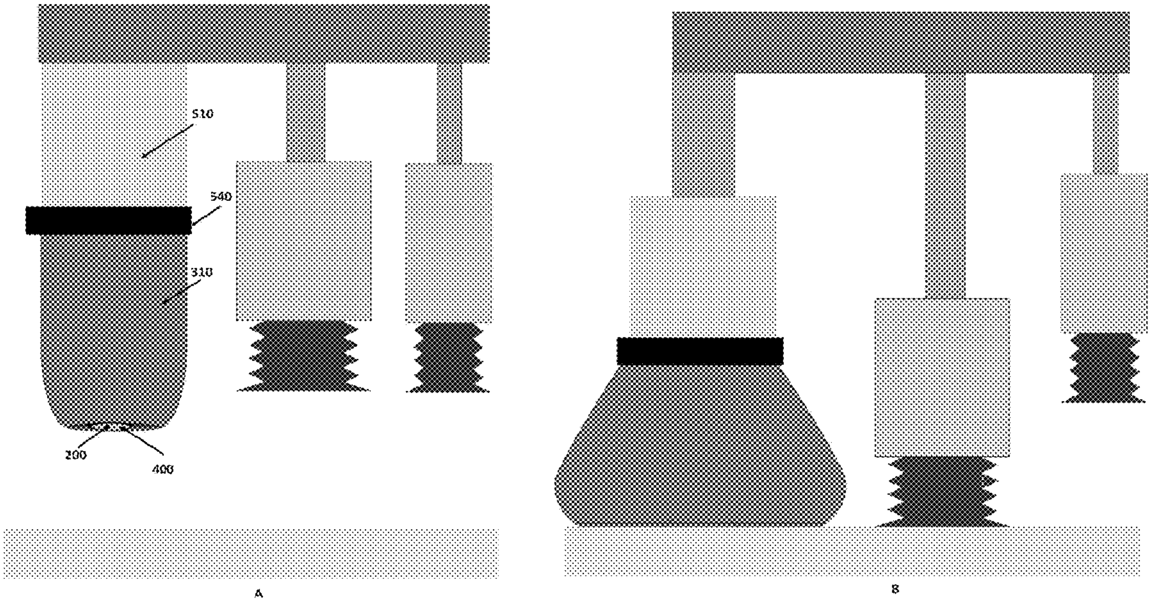
FIG. 43 is a diagram of a gripping device aided by additional of suction grippers A) before gripping and B) after gripping.
Figure 44:
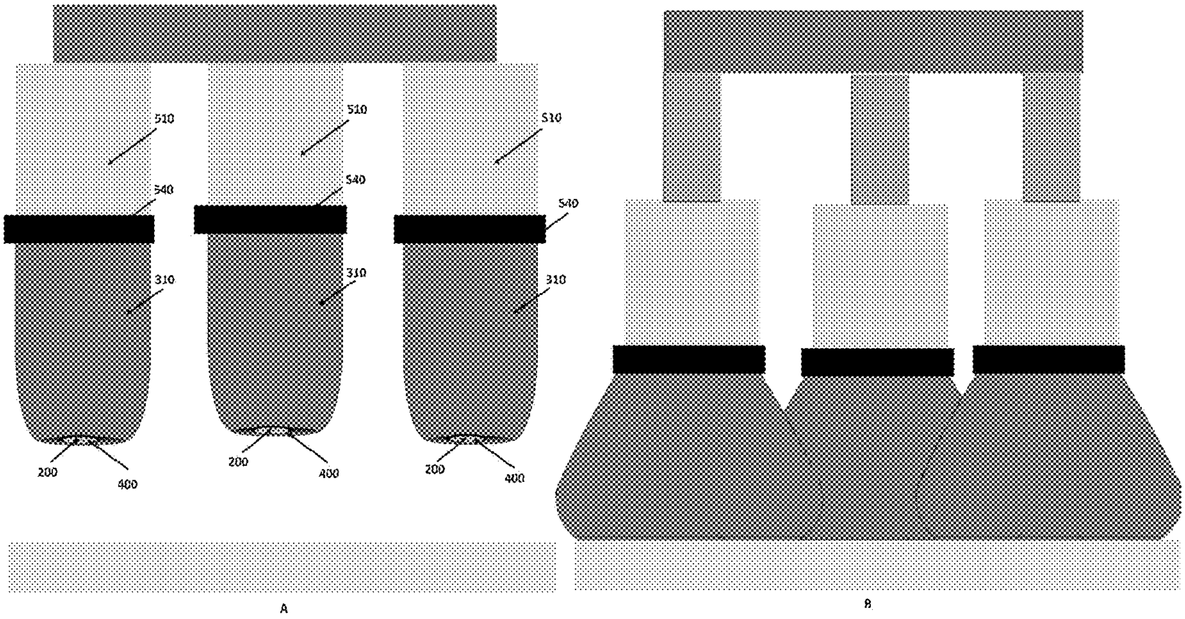
FIG. 44 is a diagram of an array of gripping before gripping (A) and after gripping (B).

In another embodiment, the chamber wall 510 may have a compliant region 710 near the membrane 300 attachment point that may allow the chamber itself to act as a large suction cup as illustrated in FIG. 40. In this case, the membrane 300 and suction device would define smaller suction regions. Additionally, the chamber wall 510 may be constructed with one or more suction passageways 730 that provide a secondary route for applying vacuum suction when using the chamber as a large suction cup. The suction passageways 730 through the chamber wall 510 may be configured with their own suction device or they may be linked to the central suction device 500. The suction passageways 730 may be configured with one or more valves to turn on/off the vacuum suction, open/close a link to the central suction device 500 or open/close a link to the chamber 100. When using the suction passageways 730, vacuum suction may be applied using a separate suction device from the central suction device 500 or, one or more valves may be used to route some or all of the vacuum suction from the central suction device 500 to the suction passageways. Additionally, suction may also be applied to the chamber 100 causing the membrane to be pulled inward and away from both the central suction device 500 and the suction passageways 730 to prevent the membrane from blocking or partially blocking the suction device 500 and the suction passageways. In order to prevent the membrane from blocking or partially blocking either the suction device 500 or the suction passageways 730, the chamber may be extended and/or the suction device 500 may be retracted as well. Additionally, a suction passageway may be created using a secondary chamber wall 720 that is concentrically larger than the chamber wall 510. The secondary chamber wall 720 may be configured with its own actuator that allow it to be extended or retracted with respect to the chamber wall 510 and the suction device 500.

Figure 25:
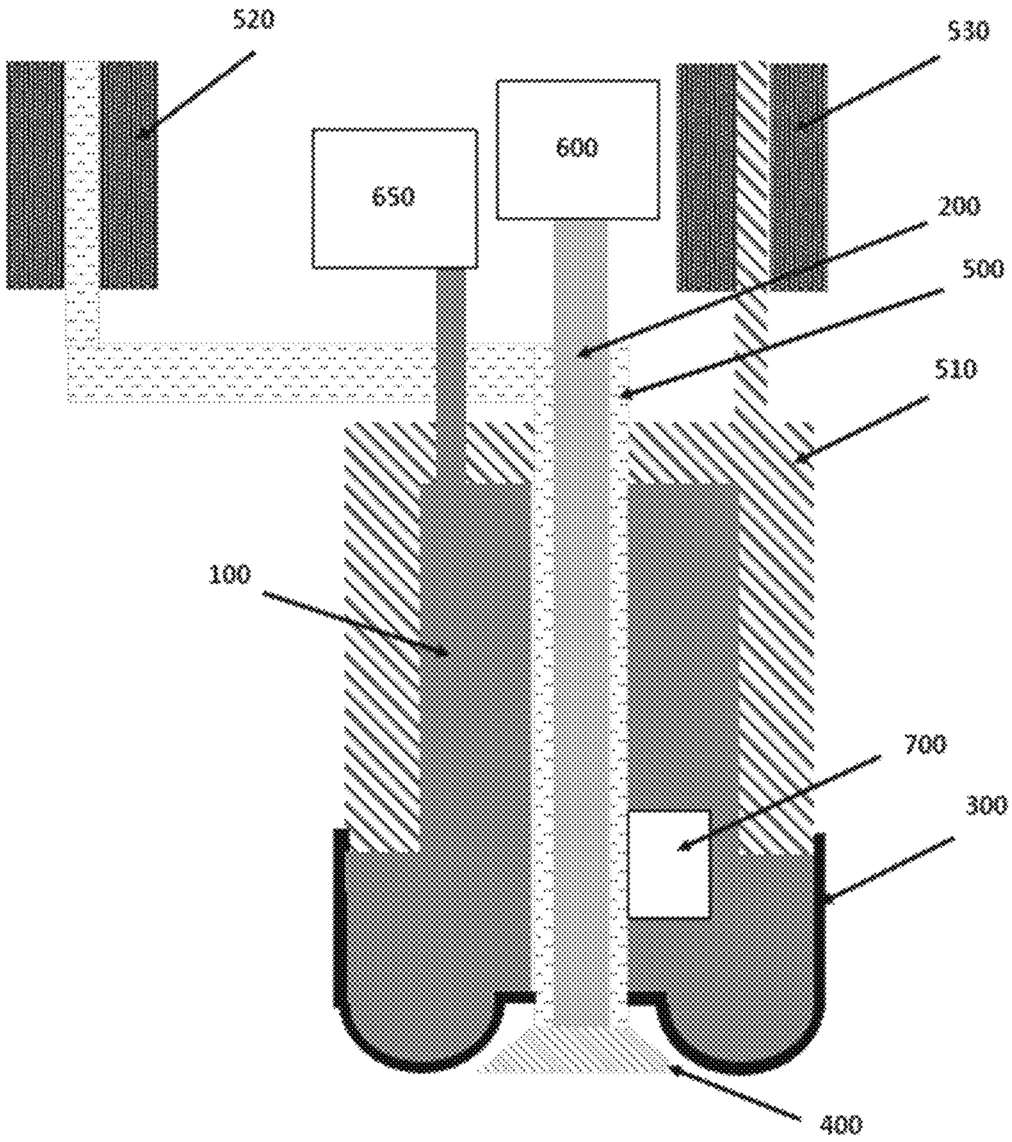
FIG. 25 is a diagram of an inner and outer suction area.

In another embodiment, the suction device 500 may be composed of multiple suction regions where an outer suction device 500 has a second smaller suction device 580 inset into the first suction device as illustrated in FIG. 25. The inner suction device may have at least one actuator 590 to move the inner suction device relative to the outer suction device 500. Wherein the inner suction device may be moved either proximally or distally with respect to the outer suction device 500. Alternatively, the inner suction device 580 may be located within the outer suction device 500 and is configured such that it protrudes from the first suction device 500 and is configured in a manner that allows the inner suction device 580 to be moved relative to the first suction device 500 in a passive manner. The suction area 410 of the inner suction device 580 may reside within the suction area 400 of the first suction device.

In the preferred embodiment, a method of grasping an item is described where the preferred embodiment of the gripping device is attached to a robot or other suitable method of moving the gripping device is used. The target pose for the gripping device may be selected manually (eg. by hand, using a robot pendant), using a software interface with user input provided by a mouse, keyboard, joystick, HMI or other device, automatically using a machine vision system based on the output from a camera or other suitable imaging device, or a hybrid of the manual and automatic methods described above. Prior to reaching the target pose, the gripping device is activated by activating the suction device 500 and adjusting the chamber wall 510 and suction device 500 positions prior to contact with an item. In this case, the membrane surface 310 may deform from the usual volcano-like structure to an annular, semi-toroidal or similar shape. The internal pressure of the at least partially sealed chamber may be adjusted to allow for increased compliance (eg. lower air pressure) or decreased compliance (eg. increased air pressure). The combination of both membrane 300 shape and compliance allows the gripping device to dynamically create a larger suction area, as defined by the membrane 300, than that defined by the suction device alone.

Figure 27:
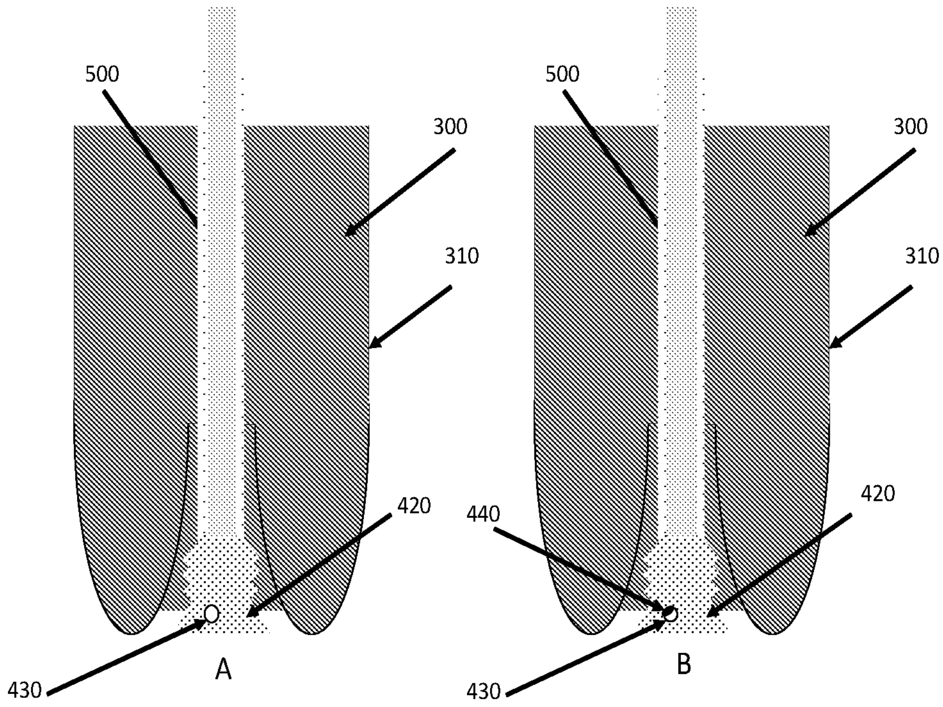
FIG. 27 is a diagram of the suction area composed of a bellows with a hole (A) and a bellows with a hole where a valve is used to limit fluid flow (B).

In the preferred embodiment, where the contact surface of the suction device is defined by a suction cup, it can be useful to utilize a suction cup with a small hole 430 in the surface to allow some level of suction leakage as illustrated in FIG. 27. When the membrane 300 of the suction device forms a larger suction area in contact with an item 800, the hole 430 in the suction device may aid in preventing the suction cup on the suction device from popping off of the item 800 and allow the suction pressure to be applied instead to the larger suction area defined by the contact region of the membrane 300. The hole 430 in the suction device may be open, partially sealed or controlled by a valve 430 that may be passive (like a flap) or active using an actuation method.

In one embodiment, the surface of the material forming the contact surface 550 between the chamber wall 510 and the at least partially sealed membrane 300 may be coated with a material that reduces impacts between an item 800 and the chamber wall 510 of the gripping device, reduces friction between the deformable membrane 300 and the chamber wall 510 and aids in reducing the effects of rubbing, pinching, crushing or impacts between the membrane 300 and the chamber wall 510 which may be organic or caused by impacts with items near the gripping device including the item 800 being picked.

In the preferred embodiment, the relative positions of the suction device and chamber along with the fluid pressure within the at least partially sealed chamber may each have a set or sets of target values which may be collectively referred to as gripping device 'modes'. The modes of the gripping device are based on specific object types and surfaces including bagged items, deformable and/or porous items, blister packed items, flat objects, etc. Blister packed items are defined here as packaging having a rigid or semi-rigid, often, but not always, wavy or corrugated, plastic layer protecting an item such as, but not limited to, AA batteries, pens, pencils, glue sticks etc. Flat objects are defined as those items having a flat surface such as a box. In most cases, the flat surface is at least as wide as the diameter of the suction device. Bagged items include any items that is packed within a bag. Examples of items that are bagged include, but are not limited to, food products such as rice, clothing, mailers as commonly used in eCommerce etc. Deformable and/or porous items include, but are not limited to, items such as socks, sponges, and loofahs.

For blister packed items, the target values are selected to ensure the gripping device presents a soft membrane 300 deformed under low fluid pressure relative to that used for deformable & porous items which allows the membrane 300 to easily conform, at least partially, to an object and defines a larger item-conforming suction area than that defined by the suction device alone. The low fluid pressure within the at least partially sealed chamber ensures that the item is not pushed away from the gripping device as it nears the item 800. Instead, the membrane 300 is soft and compliant and is easily deformed when contact with the item 800 is first made. For blister packed items, the chamber actuator has a high relative distance of travel when compared to the suction device actuator distance of travel. Grasping a blister-packed item 800 is illustrated in FIG. 12.

For bagged items that feature a loose bag, the target values and actuator movement sequence are selected so that after the membrane 300 deforms against the bagged item 800, the suction device actuator is moved proximally to further draw the loose bag material into the cavity described by the position of the suction device 500 and the central region of the deformed membrane 300 (what was previously the centre of the volcano-like shape). Drawing the bag further towards the proximal end of the gripping device ensures that the contact area between the bag and membrane 300 is increased. The membrane 300 fluid pressure can also be increased or decreased to a target value to provide additional clamping or pinching forces to the bag that are due, at least partially, to lateral forces applied against the bag as illustrated in FIG. 8. For these types of items, the chamber actuator has a moderate relative distance of travel when compared to the suction device actuator distance of travel. The chamber pressure is moderate when compared to the chamber pressure used for grasping deformable and porous items.

For bagged items that feature a tight or taut bag, the chamber position, suction device 500 position and fluid pressure target values are chosen to minimize lateral friction forces between the membrane 300 and the bag as, since the bag is not loose or stretchy, it is not able to be pulled into the suction device 500 cavity formed by the membrane 300. The mode for loose bags differs from tight bags in that, if an attempt is made to draw the bag into the cavity formed around the suction device 500 by the membrane 300, the membrane 300 will instead experience high lateral forces against the item surface which can result in reduced contact area between the membrane 300 and item as the membrane 300 may be peeled off the surface of the item. For these types of items, the chamber actuator has a high relative distance of travel when compared to the suction device actuator distance of travel. The chamber pressure is moderate when compared to the chamber pressure used for grasping deformable and porous items.

Figure 9:
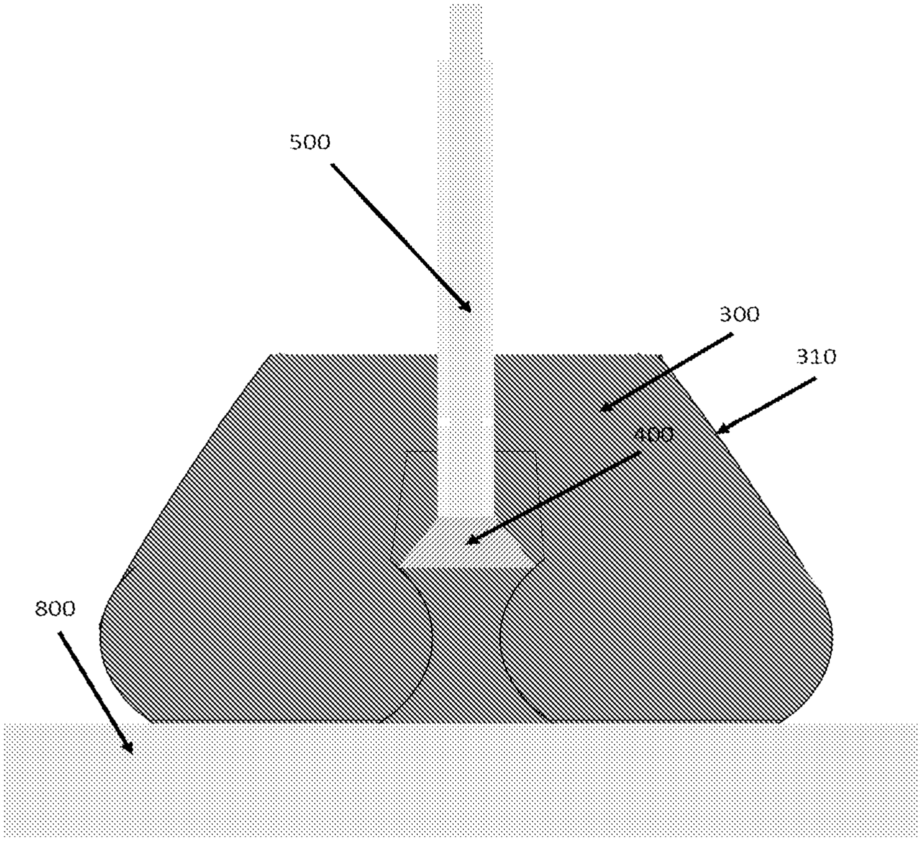
FIG. 9 is a diagram of a gripping device gripping an object with a flat surface.
Figure 10:
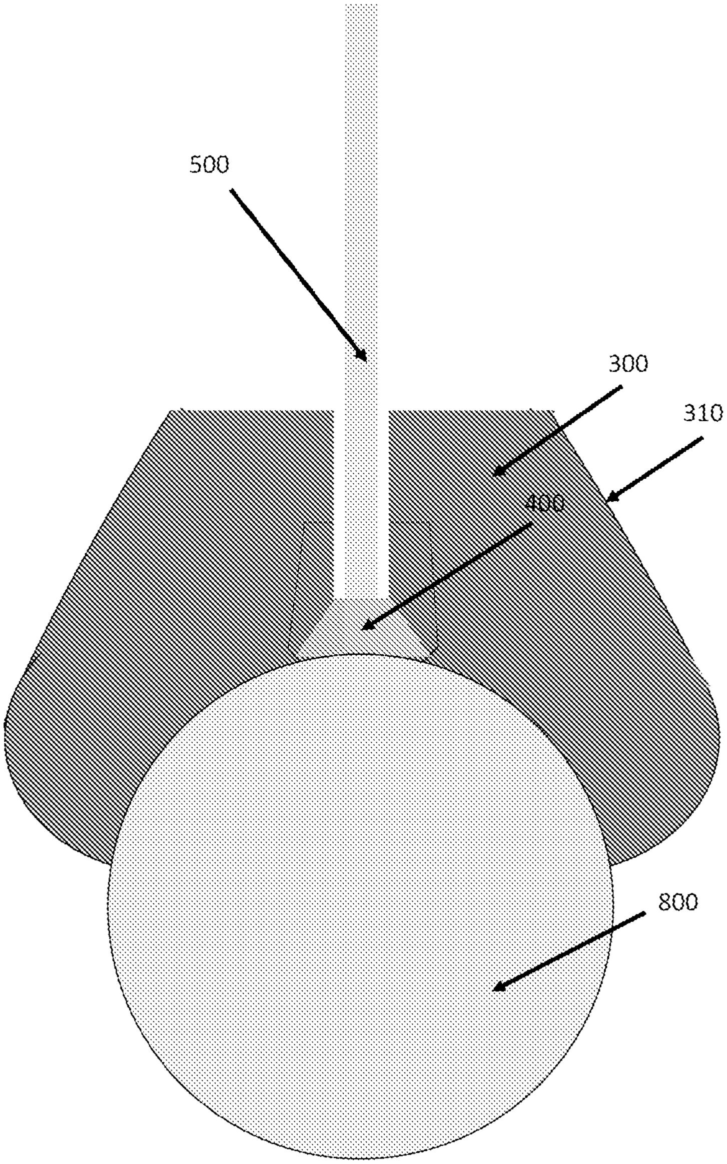
FIG. 10 is a diagram of a gripping device grasping a spherical object.

For objects presenting a flat surface with a surface area at least on parr with that of the suction area 400, the target values for the chamber position, suction device 500 position and fluid pressure of the at least partially sealed membrane 300 are selected in a similar manner to those items having a tight bag: high lateral forces at the contact surface of the item and the membrane 300 can result in reduced membrane 300 contact or membrane 300 peeling. Grasping of a flat item is illustrated in FIG. 9. For these types of items, the chamber actuator has a high relative distance of travel when compared to the suction device actuator distance of travel. The chamber pressure is moderate when compared to the chamber pressure used for grasping deformable and porous items.

For objects classified as deformable and porous, the target values for the chamber position, suction device 500 position and fluid pressure of the at least partially sealed membrane 300 are selected in a similar manner to those items having a loose bag: large displacement of both the chamber and suction device actuators and high pressurisation of the membrane allows deformable and porous items to be drawn into the orifice created around the suction device. The membrane pressurization allows the object to be 'pinched' in that same orifice area. Grasping of a deformable and porous item is illustrated in FIG. 13. For these types of items, the chamber actuator has a low relative distance of travel when compared to the suction device actuator distance of travel. The chamber pressure is pressurised to the maximum pressure allowed for the membrane.

For some objects with a large contact surface area such as, but not limited to, spherical items, it may be useful to grasp an object using one of the modes discussed earlier: bagged items, deformable and/or porous items, blister packed items, flat objects, etc. After grasping the object, it may be useful to decrease the chamber fluid pressure allowing the membrane 300 to somewhat deflate around the object and increase or maintain the contact surface area at least partially.

Figure 26:
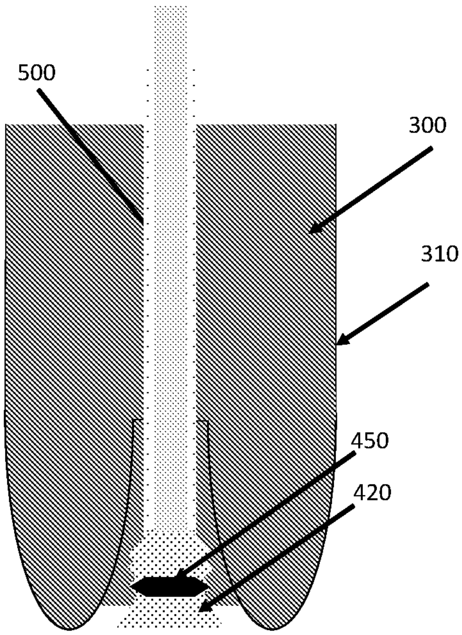
FIG. 26 is a diagram of the suction area is composed of a suction cup that may include a bellows.

In the preferred embodiment, a ring or similar structure 450, as illustrated in FIG. 26, may be placed in the suction area 400 bellows to prevent collapse of the bellows shape in case the suction pressure is too strong.

In the preferred embodiment, a method for detecting holes, tears, or perforations in a membrane 300 includes placing at least the membrane 300 at the distal end of the gripping device in a cavity 1000, increasing the membrane 300 fluid pressure to force the membrane 300 to expand while constricting the membrane 300 expansion with the cavity as illustrated in FIG. 38. If a hole or tear in the membrane 300 is present, sensors embedded on or near the gripping device can monitor the fluid flow entering the at least partially sealed chamber and determine if the flow is within a correct range for the membrane 300 vs. a higher flow when there is an undesired tear or hole.

In the preferred embodiment, a method for detecting holes, tears, or perforations in a membrane 300 includes placing at least the membrane 300 at the distal end of the gripping device in a cavity 1000, increasing the membrane 300 fluid pressure to force the membrane 300 to expand while venting the cavity 1000, perhaps with a valve. Once the membrane 300 reaches the desired pressure, sealing the cavity and using an appropriate sensor to determine if the cavity 1000 pressure increased. If a hole or tear in the membrane 300 is present, air or fluid will leak from the membrane and enter the cavity 1000 resulting in a pressure increase within the cavity 1000.

In another embodiment, a method for detecting holes, tears, or perforations in a membrane 300 is described here where a membrane at least partially sealing a chamber is inflated to a test pressure. Upon reaching the test pressure, the pressure within the at least partially sealed chamber is measured and monitored for undesirable leakage as indicated by an unexpected decrease in pressure.

In yet another embodiment, a method for detecting holes, tears, or perforations in a membrane includes monitoring control signals or sensor data, perhaps in real-time or at defined intervals, to determine a shift in either the real-time control signals, the sensor data, or both that would indicate the presence of a leak, tear, or perforation in the membrane. Control signal or sensor data could also be used to forecast and predict the probability of leaks, tears, or perforations before they occur. Examples of control signals include, but are not limited to, the frequency of a valve opening or closing increasing or decreasing as the membrane ages, the time to deflate a membrane or the time required to achieve a desired pressure within the at least partially sealed chamber may change with time and wear.

In the preferred embodiment, a method of releasing an item so that the object flattens itself out is presented. The gripping device releases a folded item, such as, but not limited to, a bag onto a convex surface from a suitable height. The combination of the drop height (impact speed) and convex surface work together to flatten the upper surface of the item allowing it to easily be picked multiple times.

In the preferred embodiment, releasing an object while the object is unsupported may result in premature membrane 300 wear as the membrane 300 may tear due the peeling action between the membrane 300 and the item.

In yet another embodiment, 'fingers' 595 or protrusions may be employed to aid in gripping or stabilizing objects before, during or after grasping or before, during or after object manipulation as illustrated in FIG. 30-35. The fingers 595 or protrusions may act as a secondary gripping mechanism or dampen object oscillations or vibrations that occur during manipulation. The fingers 595 or protrusions may have one or more suction cups 596 with or without bellows to aid with object grasping or manipulation. The fingers may be passively or actively deployed where active deployment is performed using at least one actuator and the actuation provides a means of contacting the item. Actuation of the fingers 595 or protrusions, could be performed by a mechanical means such as guided cables or fluidic, pneumatic, motorized, electronic, magnetic actuators or any other suitable actuation method. Additionally, the curvature of the fingers 595 or protrusions, which includes bending, twisting, and straightening in one or more plains as well as changes in size including shortening, elongating, swelling, shrinking, and deforming, either in the entire fingers 595 or protrusion or one or more of its parts, is obtained by varying the gas/fluid pressure, including pressurizing or depressurizing, inside the protrusions or a portion of the protrusions. The interior of the fingers 595 or protrusions may also be subdivided into multiple chambers and may be designed to encourage deformation in a specific manner or direction. The fingers 595 or protrusions may be used to actively grasp the object or provide a point of contact far from the center of mass of the object to stabilize the object. The fingers 595 could also provide a method to pull, pry, nudge or otherwise create a gap between the object and other surrounding objects by either adjusting the position of the item or by adjusting the positions of the surrounding objects. Alternatively, the fingers 595 or protrusions may be deformed by other means such as cabling.

Figure 36:
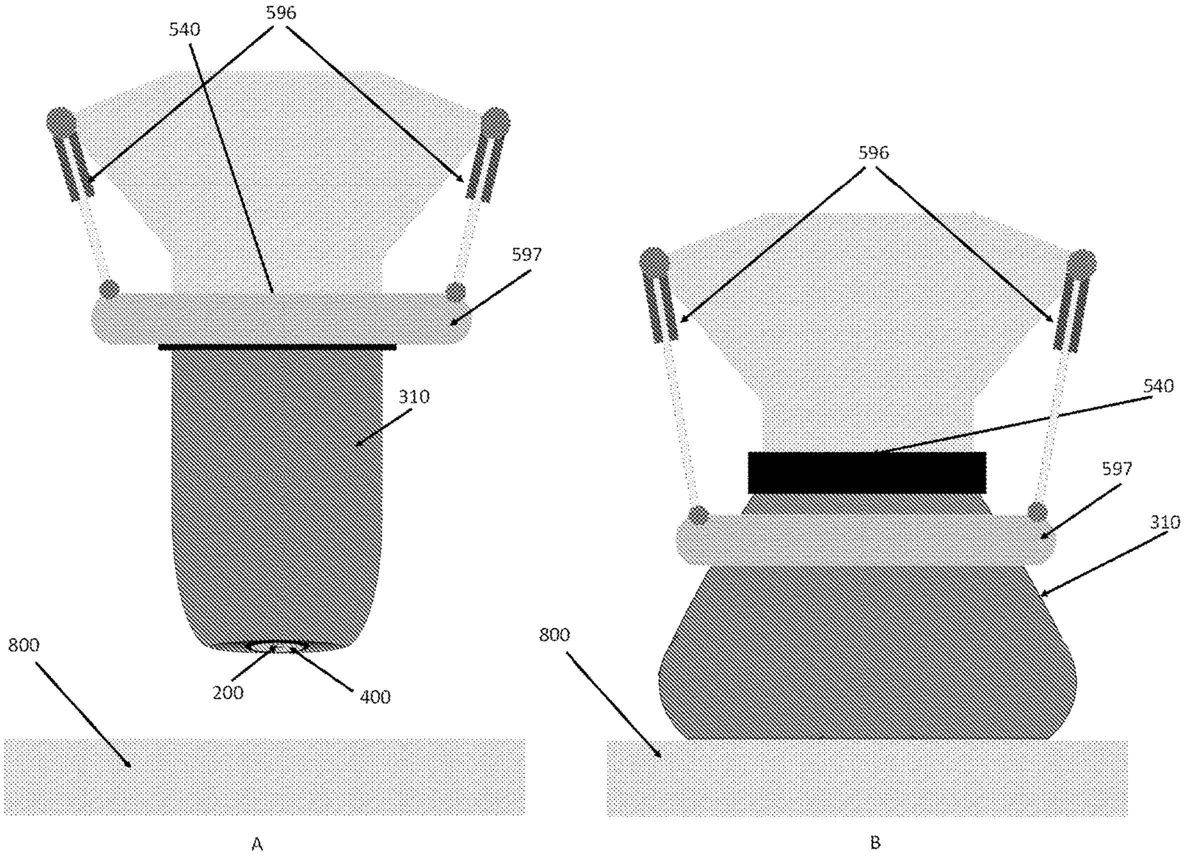
FIG. 36 is a diagram of using an actuated ring to stabilize the membrane during gripping device motion.
Figure 37:
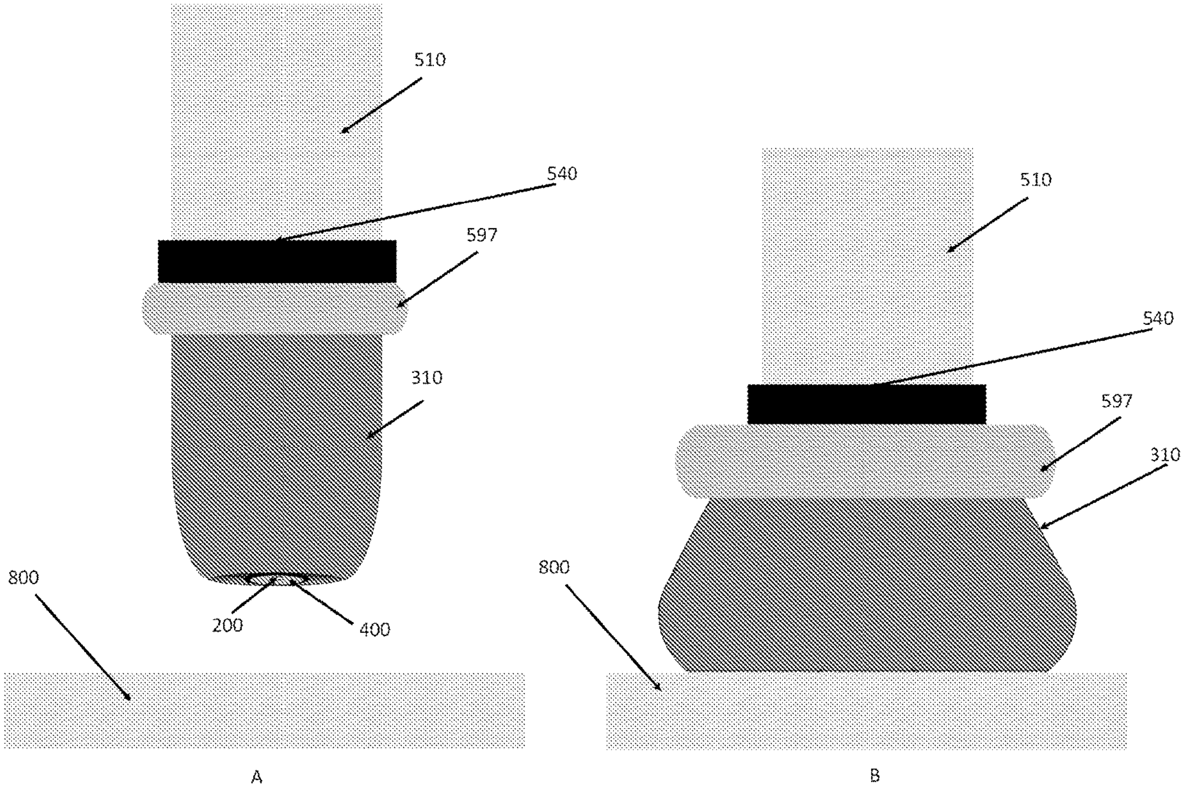
FIG. 37 is a diagram of using an embedded bladder to stabilize the membrane during gripping device motion.

In yet another embodiment, the membrane may be designed specifically to reduce oscillations using a damper 597 as illustrated in FIG. 36-37. Reduced membrane oscillations may be achieved by designing a damping device 597 into the region of the membrane near where the membrane attaches to the chamber. This could be done by creating a region of the membrane that is thicker, with small embedding bladder(s), with a material that is designed to stiffen by phase-change, magnetic, electrical, or other suitable means. Alternatively, membrane oscillations may also be dampened using a damping device 597 created by locating actuators 596, small bladders or expandable materials on the chamber walls of the gripping device. Another damping 597 method could be to use an actuated damping device formed into a ring attached to the chamber and designed to slide towards the distal end of the gripper using actuators 596 thus acting as a mechanical means to restrict or retain the membrane and prevent oscillations or membrane wobble.

In yet another embodiment, the gripping device may be paired with at least one additional suction device or gripping devices as illustrated in FIG. 41-44. The additional suction devices and/or gripping devices may have different diameters and may be individually optimized for grasping a specific range or set of items. The gripping device and suction devices may be mounted to a structure, disc or plate and may have actuators that allow the gripping device or suction devices to be individually, or as a group, extended closer to the object being grasped. In this way, the user or control software can select which gripping device or suction device is to be used in a specific situation. The assembly or array of gripping devices and/or additional suction devices is configured in such a manner as to allow for the assembly to be mounted on a robot manipulator where the gripping and suction devices are configured at the distal end.

SUMMARY OF CLAIMS

According to embodiments of the disclosure, a robotic picking assembly is disclosed. The robotic picking assembly consists of a robotic manipulator, a gripping device attached to the robotic manipulator and configured to pick up, manipulate and release objects. The gripping device comprises at least one elastic membrane at least partially sealing at least one chamber, wherein the said at least one elastic membrane is attached to a wall of said chamber, wherein a suction device is attached to the membrane, and wherein the said chamber is configured to allow the uninterrupted passage of the suction device through the said chamber, at least one actuator configured to actuate the at least one said chamber, at least one actuator configured to actuate the at least one said suction device, at least one actuator configured to allow fluid communication to the said at least partially sealed chamber.

According to the disclosure, the elastic membrane is configured to be dynamically deformed by the actuation of one or more chambers, actuation of one or more suction devices, or the actuation of one or more fluid communication actuators. The device of claim 1 where the surface shape of the membrane is formed by a continuous curved line revolved around an axis, where the continuous curved line can be described by at least one of the following mathematical functions including linear, quadratic, power, logarithmic, polynomial, rational, exponential, sinusoidal, semi-circular, semi-elliptical, parabolic, hyperbolic, a line with a continuous derivative, or a piecewise continuous combination of any of the previous functions or any other mathematical function.

According to the disclosure, the membrane is composed of at least one layer of silicone, latex, urethane, polyurethane, any combination of these materials or any other suitable elastic material. The membrane may have regions with increased or decreased friction, hardness, density, elastic modulus, viscosity, 100% modulus, tensile strength, tear strength, elongation at break, specific gravity, specific volume, shrinkage, temperature, UV absorption or reflection, IR absorption or reflection, X-Ray absorption or reflection, refractive index, resistivity, radiation shielding, thermal conductivity, dielectric strength or dielectric constant, relative permittivity, permeability, susceptibility, acoustic impedance, acoustic attenuation or transmission, or any other material property not listed explicitly here.

According to the disclosure, the membrane surface may be at least partially designed for handling food or hazardous materials. The membrane may have regions with increased or decreased thickness where the change in thickness may restrict, encourage, or direct membrane deformation in a particular manner or direction. The membrane surface is formed by casting the uncured elastic material onto a mold, spray coating a mold, or coating a mold by dipping the mold in a liquid membrane material and wherein the liquid membrane material is cured into a desired shape.

According to the disclosure, the mold is configured to rotate while the membrane material cures. The elastic materials may be layered upon each other in a controlled manner to create regions of the membrane with different thicknesses or surface features; and wherein additional layers may be applied while the previous layer(s) are fully cured, partially cured or uncured. The membrane material is cured in a controlled environment, wherein at least the temperature, pressure or humidity are monitored or controlled. The suction device terminates in a suction area and is formed by a suction cup.

According to the disclosure, at least one sensing device is attached to the said suction device. The sensing device is configured to detect force, pressure or proximity.

According to the disclosure, the membrane is attached to the chamber wall or the suction device using a bayonet clip, screws, clamps, snap rings, hose clamps, spring bands, push-to-connect fittings, acoustic welding, solvent bonding, glue, any combination of the above methods or any other suitable bonding method. The attachment point between the chamber wall and the membrane is coated with a soft or low friction material.

According to the disclosure, the suction device is attached to a tube that passes through the chamber wall. The tube facilitates fluid communication between the suction area and a suction pump, venturi, pressure pump, any combination of the above or any other suitable means. The tube allows the passage of wires or tubing. The tube allows the placement of sensors.

According to the disclosure, the chamber walls are composed of an elastic material to allow the chamber walls to flex or bend. The chamber walls may be corrugated or formed into bellows. The flexing or bending of the chamber walls is actively controlled.

According to the disclosure, the flexing or bending of the chamber walls is obtained by actuation through pressure control, cable driven, pneumatic, electrical or magnetic means. The flexing or bending of the chamber walls is obtained by partitioning of the chamber into multiple sub-chambers where such partitioning consists of by partitioning the chamber into sub-chambers and actively controlling the fluid pressure within the individual chambers. The suction device is and the curvature of the suction device is controlled by an actuator.

According to the disclosure, the suction device contains multiple suction cups, a hole/valve in a suction cup and/or a ring to prevent collapse of the bellows. The additional suction device is attached to at least one actuator and may be moved relative to the first suction device. The suction cup may have bellows, a hole or valve. The bellows may contain an apparatus designed to limit the collapse of the bellows under high suction pressure.

According to the disclosure, the valve regulates the pressure within the suction area. The valve regulates the pressure within the suction area defined by the membrane. The valve equalizes the pressure within the suction area and the suction area defined by the membrane. The grasping reinforcement is provided by one or more protrusions.

According to the disclosure, the protrusions are actuated by a mechanical means delivered by electrical, pneumatic, or magnetic methods. The protrusions aid in separating items from nearby objects. The protrusions have suction cups. The suction cups may have bellows.

According to the disclosure, the changes in the curvature of the protrusion, which includes bending, twisting, and straightening, in one or multiple plains and changing in size, including shortening, elongating, swelling, shrinking, and deforming, either in the entire protrusion or one or more of its parts, is obtained by varying the gas/fluid pressure, including pressurizing and depressurizing, inside the protrusion.

According to the disclosure, the inside of the protrusion consists of a plurality of chambers. The pressure in each chamber contributes to the deformation of the said protrusion. The membrane is designed to reduce or dampen oscillations or undesired vibration. The dampening of oscillations is performed by embedding structures into the membrane or chamber near the attachment point of the chamber to the membrane. These structures include thickening of the membrane, fluid actuated bladders, materials where the stiffness may be adjusted, or mechanical actuators According to the disclosure, the chamber wall is configured with a compliant region that may act as a large suction area. The passageways through the chamber wall provide a secondary means of applying vacuum suction to the large suction area. The one or more valves are used to dynamically route vacuum suction to the suction passageways, suction device or the at least partially sealed chamber.

According to the disclosure, a method of grasping, manipulating, and releasing at least one object. The method comprises the steps of bringing the gripping device near the object, activating the suction device, dynamically deforming the membrane against the surface of the object, and gripping the object using at least one chamber wall actuator, at least one suction device actuator, at least one fluid communication actuator, or any combination of the above actuators.

According to the disclosure, the step of activating the suction device results in the creation of a negative pressure within the suction area. The step of releasing the object is performed by dynamically adjusting the chamber and suction device actuators to reverse the membrane deformation and deactivate the suction device. The fluid flow in the suction device is reversed to create a positive pressure within the suction area.

According to the disclosure, the dynamic deformation of the membrane creates a second suction area that is larger than the first suction area.

According to the disclosure, the object target location is determined using a sensing system and computer algorithm that detects the surface of the object and scans the surface of the object for suitable picking locations.

According to the disclosure, a sensing system and computer algorithm scans the region of the object surface around the said suitable picking locations; Determines the item type based on surface and image characteristics and assigns target values for the chamber wall, suction device, and fluid communication actuators.

According to the disclosure, the gripping device dynamically adjusts the membrane deformation by dynamically matching the position of the at least one chamber wall, at least one suction device, and at least one fluid communication actuator to match target values. The set of actuator target values composes a mode.

According to the disclosure, the mode for an item with a corrugated surface, flat surface, within a tight bag, within a loose bag or deformable or porous items utilizes relatively low, or minimal, fluid pressure within the at least partially sealed chamber, relatively high movement of the chamber wall actuator, and relatively low movement of the suction device actuator.

According to the disclosure, the item is first grasped with a relatively high fluid pressure within the at least partially sealed chamber and then, upon grasping the item, the pressure within the at least partially sealed chamber is reduced. The positioning of the gripping device is controlled dynamically by monitoring at least one sensor, starting, stopping or adjusting the motion of a robotic manipulator based on the output of the said sensor. The sensor is composed of a force sensor, pressure sensor, contact sensor, proximity sensor or any combination of the above sensors.

According to the disclosure, a method for detecting perforations within the membrane of an at least partially sealed chamber. The method comprises the steps of locating the membrane portion of the distal end of the gripping device within a test chamber, inflating the gripping device membrane to a suitable pressure while a valve in fluid communication with the test chamber ensures the test chamber does not pressurize during the pressurization of the membrane, closing the test chamber valve once the desired membrane pressurization is achieved and measuring the pressure within the test chamber while maintaining membrane pressurization. An increase in the test chamber pressure indicates at least one perforation in the membrane.

According to the disclosure, a method of releasing an item to minimize the item from folding on itself where the object is released by the gripping device from a suitable height above a convex surface. The method of minimizing membrane wear by supporting an object during its release.

According to the disclosure, a method for detecting perforations within the membrane of an at least partially sealed chamber by inflating a membrane by pressurizing the at least partially sealed chamber to a suitable test pressure, measuring the pressure within the at least partially sealed chamber using at least one sensor. The pressure within the partially sealed chamber is measured using a pressure sensor.

According to the disclosure, a method of grasping an object where the membrane is deformed into contact with an object, the suction device is activated and protrusions or fingers are used to stabilize the object. The protrusions or fingers are used to adjust the position of the item prior to deforming the membrane. The protrusions or fingers contact the item and limit the deformation or change the shape of the object. The protrusions or fingers are used to close, keep closed, hold or support the object.

According to the disclosure, the item is a book, a box with a tuck lid, a loose lid, or some other type of closure.

According to the disclosure, a method of replacing the membrane on the gripping device where the membrane region is inserted into a membrane removal tool, the membrane removal tool manipulates the membrane attachment point and the membrane is detached.

According to the disclosure, the membrane removal tool manipulates the membrane attachment point using gripping, squeezing, a magnetic field, heat, robotic manipulators, force, pressure, a twisting action, or any other suitable manipulation method. The membrane is detached using a twisting, pushing, or pulling motion of the gripping device. The motion of the gripping device is performed by a robotic manipulator.

According to the disclosure, the suction device is retracted, the chamber is extended, the rim of the chamber wall has been configured with a compliant region, and suction passageways through the chamber wall are used to route vacuum suction and form a secondary, larger suction device. The suction passageway is routed between the chamber wall and a secondary, larger, concentric chamber wall that is attached to an actuator and where the secondary chamber wall is extended or retracted relative to the chamber wall.

According to the disclosure, the vacuum suction may be routed to the suction passageway, suction device or to the at least partially sealed chamber using one or more valves. The vacuum suction routing, chamber position, suction device position are dynamically adjusted to draw the membrane away from the suction device and suction passageways.

Implementations disclosed herein provide systems, methods and apparatus for generating or augmenting training data sets for machine learning training. The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor. A "module" can be considered as a processor executing computer-readable code.

A processor as described herein can be a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-build for one or both of model training and model inference.

The disclosed or illustrated tasks can be distributed across multiple processors or computing devices of a computer system, including computing devices that are geographically distributed. The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on." While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above-described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed is:

1. A robotic picking assembly comprising:
a robotic manipulator;
a gripping device attached to the robotic manipulator and configured to pick up, manipulate and release objects, the gripping device comprising:
at least one elastic membrane at least partially sealing at least one chamber, wherein the said at least one elastic membrane is attached to a wall of said chamber, wherein a suction device is attached to the membrane, and wherein the said chamber is configured to allow the uninterrupted passage of the suction device through the said chamber;
at least one actuator configured to actuate the at least one said chamber;
at least one actuator configured to actuate the at least one said suction device; and
at least one actuator configured to allow fluid communication to the said at least partially sealed chamber.

2. The device of claim 1 where the elastic membrane is configured to be dynamically deformed by the actuation of one or more chambers, actuation of one or more suction devices, or the actuation of one or more fluid communication actuators.

3. The device of claim 1 where the surface shape of the membrane is formed by a continuous curved line revolved around an axis, wherein the continuous curved line is computed with a mathematical function selected from a list consisting of linear function, quadratic function, power function, logarithmic function, polynomial function, rational function, exponential function, sinusoidal function, semi-circular function, semi-elliptical function, parabolic function, hyperbolic function, a line with a continuous derivative, or a piecewise continuous combination of any of the previous functions or any other mathematical function.

4. The device of claim 1 where the membrane is composed of at least one layer of material selected from a list consisting of silicone, latex, urethane, polyurethane, any combination of these materials, or any other suitable elastic material.

5. The device of claim 4 where the membrane may have regions with increased or decreased friction, hardness, density, elastic modulus, viscosity, 100% modulus, tensile strength, tear strength, elongation at break, specific gravity, specific volume, shrinkage, temperature, UV absorption or reflection, IR absorption or reflection, X-Ray absorption or reflection, refractive index, resistivity, radiation shielding, thermal conductivity, dielectric strength or dielectric constant, relative permittivity, permeability, susceptibility, acoustic impedance or acoustic attenuation or transmission.

6. The device of claim 5 where the membrane may have regions with increased or decreased thickness where the change in thickness may restrict, encourage, or direct membrane deformation in a particular manner or direction.

7. The device of claim 4 where the membrane surface is formed by casting the uncured elastic material onto a mold, spray coating a mold, coating a mold by dipping the mold in a liquid membrane material, wherein the liquid membrane material is cured into a desired shape.

8. The device of claim 7 where the mold is configured to rotate while the membrane material cures.

9. The device of claim 8 where elastic materials may be layered upon each other in a controlled manner to create regions of the membrane with different thicknesses or surface features; and wherein additional layers may be applied while the previous layer(s) are fully cured, partially cured or uncured.

10. The device of claim 8 where the membrane material is cured in a controlled environment, wherein at least the temperature, pressure or humidity are monitored or controlled.

11. The device of claim 1 where at least one sensing device is attached to the said suction device.

12. The device of claim 6 where the sensing device is configured to detect force, pressure, or proximity.

13. The device of claim 1 where the suction device is attached to a tube that passes through the chamber wall.

14. The device of claim 13 where the tube facilitates fluid communication between the suction area and a suction pump, a venturi, a pressure pump.

15. A method of grasping, manipulating, and releasing at least one object, comprising the steps of:
bringing the gripping device near the object;
activating the suction device;
dynamically deforming the membrane against the surface of the object; and
gripping the object.

16. The method of claim 15 further comprising at least one chamber wall actuator, at least one suction device actuator and at least one fluid communication actuator.

17. The method of claim 15 wherein activating the suction device results in the creation of a negative pressure within the suction area.

18. The method of claim 15 wherein releasing the object is performed by dynamically adjusting the chamber and suction device actuators to reverse the membrane deformation and deactivate the suction device.

19. The method of claim 15 wherein the fluid flow in the suction device is reversed to create a positive pressure within the suction area.

20. The method of claim 15 wherein the dynamic deformation of the membrane creates a second suction area that is larger than the first suction area.

21. The method of claim 15 where the positioning of the gripping device is controlled dynamically by monitoring at least one sensor and starting, stopping or adjusting the motion of a robotic manipulator based on the output of the said sensor.

22. The method of claim 21 where the sensor is selected from a list consisting of a force sensor, a pressure sensor, a contact sensor, a proximity sensor, a camera, a depth camera, a 3D scanning device.

23. A method for detecting perforations within the membrane of an at least partially sealed chamber, comprising the steps of:
locating the membrane portion of the distal end of the gripping device within a test chamber;
inflating the gripping device membrane to a suitable pressure while a valve in fluid communication with the test chamber ensures the test chamber does not pressurize during the pressurization of the membrane;
closing the test chamber valve once the desired membrane pressurization is achieved; and
measuring the pressure within the test chamber while maintaining membrane pressurization.

24. The method of claim 23 wherein an increase in the test chamber pressure indicates at least one perforation in the membrane.

* * * * *